United States Patent
Johnson et al.

(10) Patent No.: US 9,799,918 B2
(45) Date of Patent: Oct. 24, 2017

(54) ORGANOSILICON—CONTAINING ELECTROLYTE COMPOSITIONS HAVING ENHANCED ELECTROCHEMICAL AND THERMAL STABILITY

(71) Applicant: Silatronix, Inc., Madison, WI (US)

(72) Inventors: Tobias Johnson, Madison, WI (US); Michael Pollina, Elkridge, MD (US); Liu Zhou, Middleton, WI (US); Monica Usrey, Madison, WI (US); Deborah Gilbert, Fitchburg, WI (US); Peng Du, Sun Prairie, WI (US)

(73) Assignee: Silatronix, Inc., Madison, WI (US)

( * ) Notice: Subject to any disclaimer, the term of this patent is extended or adjusted under 35 U.S.C. 154(b) by 0 days.

(21) Appl. No.: 15/584,483

(22) Filed: May 2, 2017

(65) Prior Publication Data
US 2017/0237117 A1    Aug. 17, 2017

Related U.S. Application Data

(63) Continuation of application No. 15/038,690, filed as application No. PCT/US2015/053699 on Oct. 2, 2015, now Pat. No. 9,680,185.

(Continued)

(51) Int. Cl.
| | |
|---|---|
| *H01M 10/05* | (2010.01) |
| *H01M 10/0525* | (2010.01) |
| *H01M 10/0567* | (2010.01) |
| *H01M 10/0568* | (2010.01) |
| *H01M 10/0569* | (2010.01) |
| *H01M 10/052* | (2010.01) |

(52) U.S. Cl.
CPC ..... *H01M 10/0525* (2013.01); *H01M 10/0567* (2013.01); *H01M 10/0568* (2013.01); *H01M 10/0569* (2013.01); *H01M 10/052* (2013.01); *H01M 2300/0028* (2013.01)

(58) Field of Classification Search
CPC .................................................. H01M 10/05
See application file for complete search history.

(56) References Cited

U.S. PATENT DOCUMENTS

| | | | |
|---|---|---|---|
| 7,473,491 | B1 | 1/2009 | Amine et al. |
| 7,588,859 | B1 | 9/2009 | Oh et al. |

(Continued)

FOREIGN PATENT DOCUMENTS

| | | |
|---|---|---|
| CN | 103579677 A | 2/2014 |
| CN | 104072533 A | 10/2014 |
| JP | 2000-243440 A | 9/2000 |
| WO | WO 2013/016836 A1 | 2/2013 |

OTHER PUBLICATIONS

International Search Report, PCT/US2015/053699, dated Dec. 28, 2015.

(Continued)

*Primary Examiner* — Jacob Marks
(74) *Attorney, Agent, or Firm* — Joseph T. Leone, Esq.; DeWitt Ross & Stevens S.C.

(57) ABSTRACT

Described are electrolyte compositions and electrochemical devices containing the electrolyte compositions. The compositions include an organosilicon compound, an imide salt and optionally $LiPF_6$. The electrolytes provide improved high-temperature performance and stability and will operate at temperatures as high as 250° C.

9 Claims, 18 Drawing Sheets

Related U.S. Application Data

(60) Provisional application No. 62/058,803, filed on Oct. 2, 2014.

(56) References Cited

U.S. PATENT DOCUMENTS

| | | |
|---|---|---|
| 7,695,860 B2 | 4/2010 | Amine et al. |
| 8,027,148 B2 | 9/2011 | West et al. |
| 8,076,031 B1 | 12/2011 | West et al. |
| 8,076,032 B1 | 12/2011 | West et al. |
| 8,765,295 B2 | 7/2014 | West et al. |
| 2012/0121974 A1 | 5/2012 | Tikhonov et al. |
| 2014/0023932 A1 | 1/2014 | Zhang et al. |
| 2014/0023937 A1* | 1/2014 | Zhang ............... H01M 10/0569 429/338 |

OTHER PUBLICATIONS

Mai et al., Organosilicon functionalized quarternary ammonium ionic liquids as electrolytes for lithium-ion batteries, *Ionics*, 2014 20:1207-1215.

Shirota et al., Why are Viscocities Lower for Ionic Liquids with—$CH_2Si(CH_3)_3$ substitutions on the Imidazolium Cations? *J. Phys. Chem. B* 2005, 109, 21576-21585.

Shirota et al., Intermolecular Interactions and Dynamics of Room Temperature Ionic Liquids That Have Silyl- and Siloxy-Substituted Imidazolium Cations, *J. Phys. Chem. B* 2007, 111, 4819-4829.

Weng et al., A disiloxane-functionalized phosphonium-based ionic liquid as electrolyte for lithium-ion batteries, *Chem. Commun.*, 2011, 47, 11969-11971.

\* cited by examiner

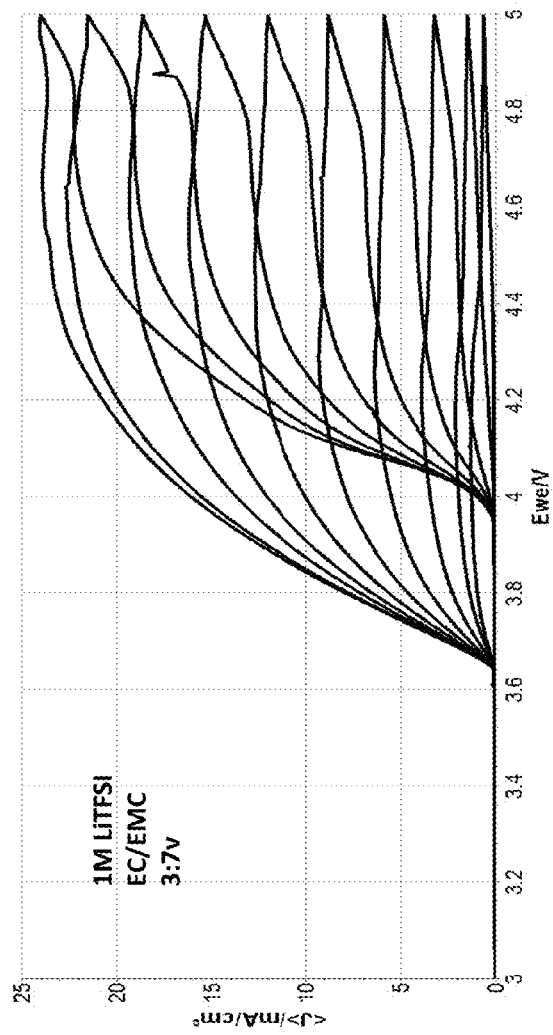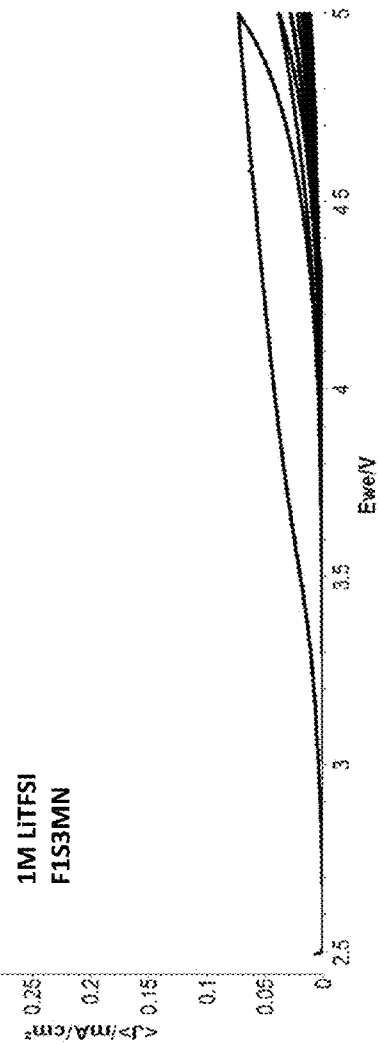
FIG. 4A
FIG. 4B

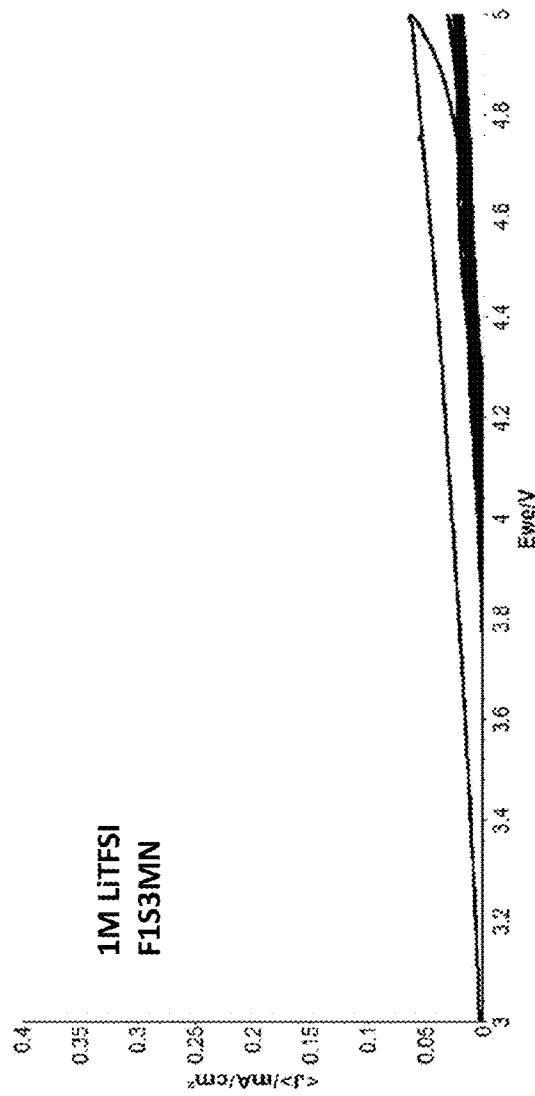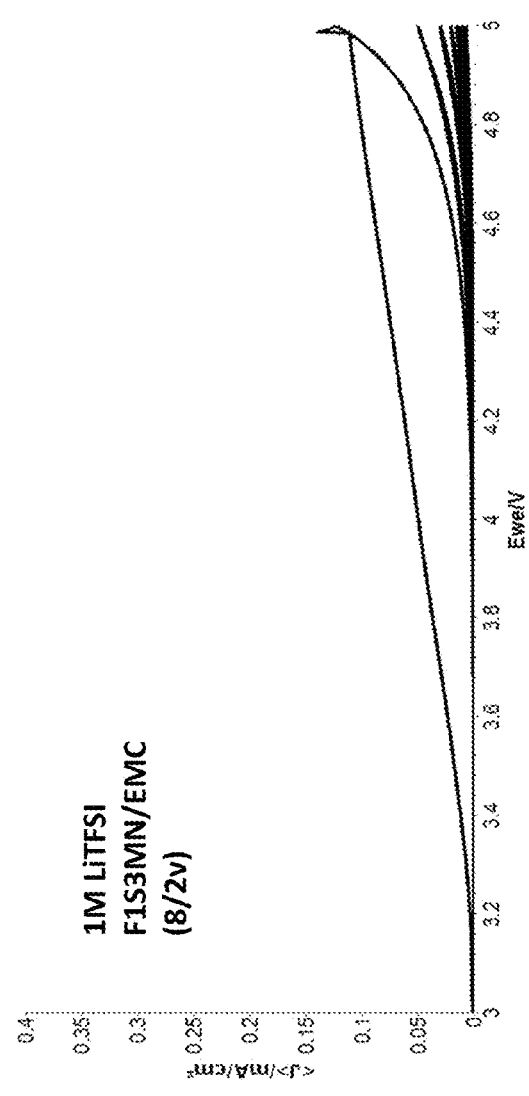
FIG. 6A
FIG. 6B

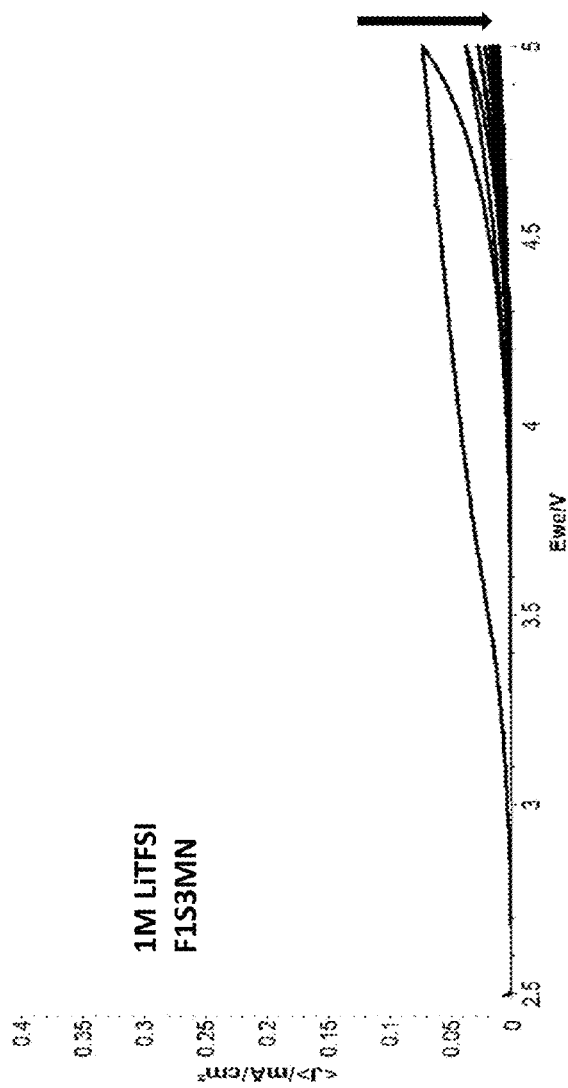
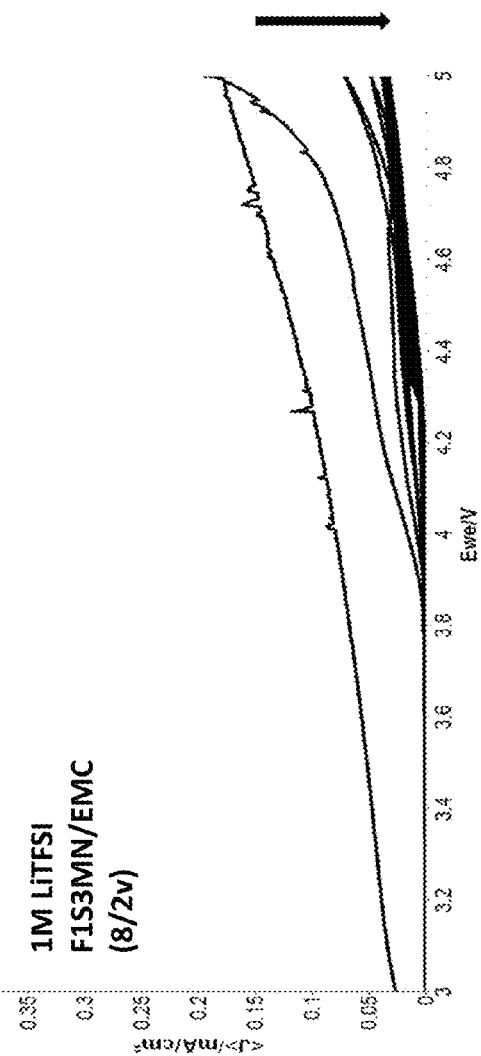
FIG. 7A
FIG. 7B

ORGANOSILICON—CONTAINING ELECTROLYTE COMPOSITIONS HAVING ENHANCED ELECTROCHEMICAL AND THERMAL STABILITY

CROSS-REFERENCE TO RELATED APPLICATIONS

This is a continuation of co-pending application Ser. No. 15/038,690, filed May 23, 2016, which is a Section 371 of PCT/US2015/053699, filed Oct. 2, 2015, which claims priority to provisional application Serial No. 62/058,803, filed Oct. 2, 2014, all of which are incorporated herein.

BACKGROUND

Liquid electrolytes in Li-ion batteries conventionally comprise a lithium salt, usually $LiPF_6$, in an organic solvent blend of ethylene carbonate (EC) and one or more co-solvents such as dimethyl carbonate (DMC), diethyl carbonate (DEC), or ethylmethyl carbonate (EMC). Unfortunately, $LiPF_6$ is unstable in these carbonate solvents above 60° C., as well as at charge voltages above 4.3 volts. Operation of a Li-ion battery above these temperatures or voltages results in rapid degradation of electrode materials and battery performance. In addition, current Li-ion electrolyte solvents exhibit flashpoints around 35° C., and are the major source of the energy released during an extreme Li-ion cell failure. Given these significant limitations, current electrolytes are impeding the development of advanced Li-ion batteries for all uses, including portable products, electric drive vehicles (EDVs), and utility scale use. A dramatic reduction in battery failure rate is also required for large scale Li-ion batteries to effectively serve applications in EDVs and grid storage.

Thus, there is a long-felt and unmet need for improved electrolyte solutions in energy storage devices such as Li-ion batteries.

BRIEF DESCRIPTION OF THE DRAWINGS

FIG. 4A, FIG. 4B, FIG. 4C, and FIG. 4D are a series of voltammograms taken at 50° C. comparing the performance of the organosilicon- and imide-containing electrolytes disclosed herein versus the corresponding carbonate-containing electrolytes. See text for complete details.

FIG. 6A, FIG. 6B, and FIG. 6C are a series of voltammograms taken at 30° C., using the apparatus described in FIG. 5, comparing the performance of the organosilicon-, carbonate- and imide-containing electrolytes disclosed herein versus the corresponding electrolytes containing only carbonate additives (i.e., no imide additive). See text for complete details.

FIG. 7A, FIG. 7B, and 7C are a series of voltammograms taken at 50° C., using the apparatus described in FIG. 5, comparing the performance of the organosilicon-, carbonate- and imide-containing electrolytes disclosed herein versus the corresponding electrolytes containing only carbonate additives (i.e., no imide additive). See text for complete details.

FIG. 12 is a trace depicting cycling stability at 70° C. with

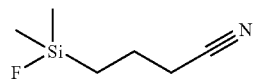

(F1S₃MN) electrolyte alone and in combination with 20% EC, using LiTFSI or $LiPF_6$ as the salt. The measurements were taken in coin cells with lithium iron phosphate/graphite electrodes; 1 C charge/2 C discharge; from 3.8 V to 2.5 V; 300 cycles.

Figure 13:
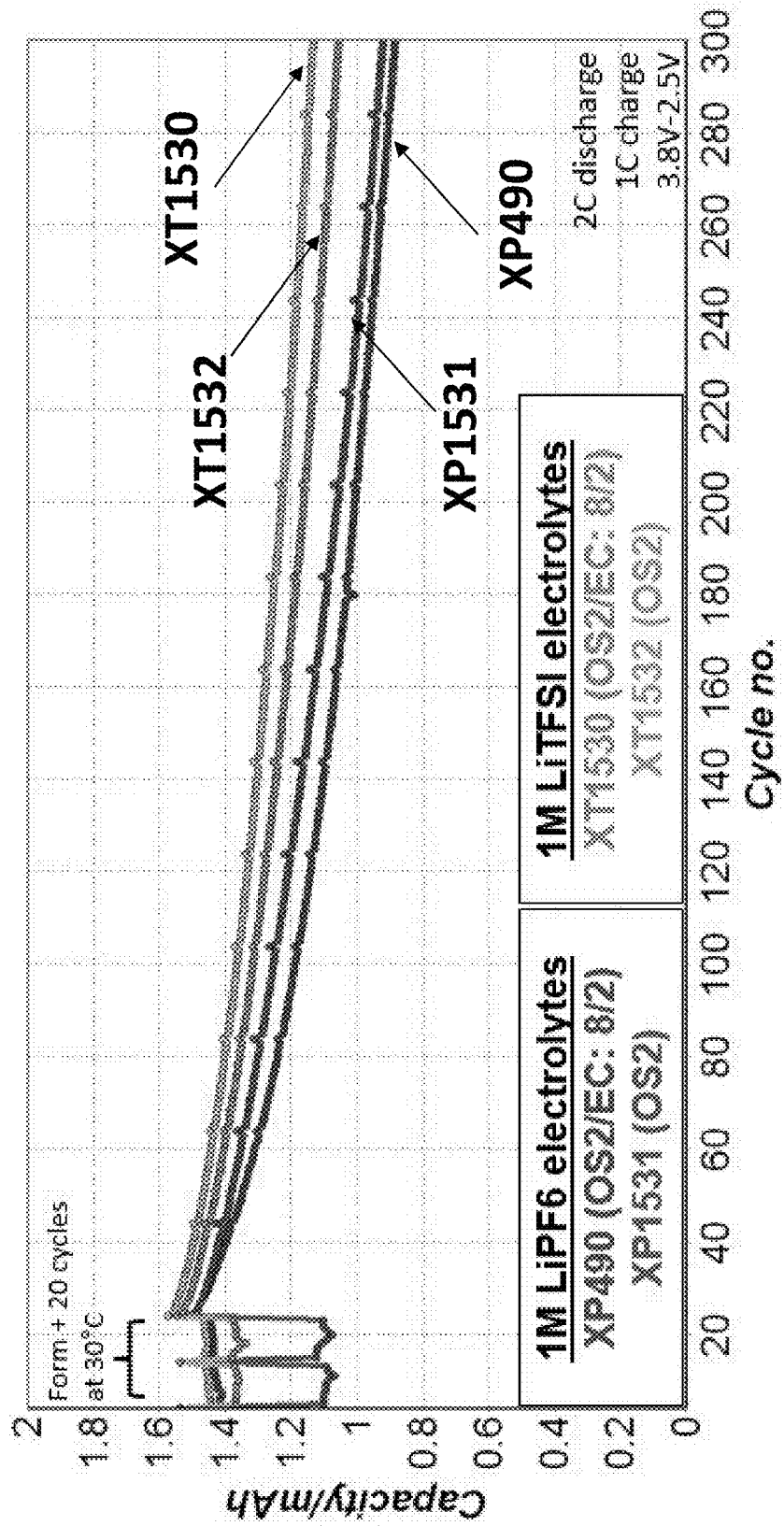

FIG. 13 is a trace depicting cycling stability at 70° C. with

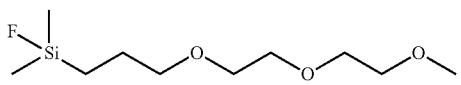

(F1S₃M2) electrolyte alone and in combination with 20% EC, using LiTFSI or $LiPF_6$ as the salt. The measurements were taken in coin cells with lithium iron phosphate/graphite electrodes; 1C charge/2 C discharge; from 3.8 V to 2.5 V; 300 cycles.

DETAILED DESCRIPTION

Disclosed herein are electrolyte compositions comprising at least one organosilicon compound and at least one imide-containing compound, typically an imide salt. These compositions display unexpectedly increased thermostability. Many of them will operate at temperatures above 70° C., above 100° C., above 150° C., above 200° C., and even above 250° C.

Disclosed herein are organosilicon (OS) compounds for use as electrolyte solvents in electrochemical devices, among other uses. In general, OS compounds are environmentally friendly, non-flammable, high temperature-resistant materials. These characteristics make OS materials well-suited for use as electrolyte solvents, binders, and coatings in energy storage devices. OS-based electrolytes are compatible with all lithium (Li) based electrochemical systems, including primary and rechargeable batteries, (i.e. Li-ion, Li-air), and capacitors (i.e. super/ultra-capacitors). The process of designing OS-based electrolytes into a Li battery involves limited changes in the cell design, and these electrolytes can be incorporated into production operations with existing manufacturing processes and equipment.

The OS-containing electrolytes described herein can be used as liquid electrolyte solvents that replace the carbonate-based solvent system in traditional Li-ion batteries. The OS-based solvents provide significant improvements in performance and abuse tolerance in Li-ion batteries, including increased thermal stability for longer life at elevated temperatures, increased electrolyte flash points for improved safety, increased voltage stability to allow use of high voltage cathode materials and achieve higher energy density, reduced battery failure rates for consistency with the requirements for large scale Li batteries used in electric drive vehicles and grid storage applications, and compatibility with materials currently in use in Li-ion batteries for ease of adoption in current designs. Electrical double-layer capacitor (EDLC) devices have also demonstrated functionality with OS-based electrolytes. The OS compounds described herein can be used in OS-based electrolyte blends to meet the requirements of specific applications in the industrial, military, and consumer product devices.

Specifically disclosed herein are:

An electrolyte composition comprising, in combination:
an organosilicon compound and an imide salt and optionally LiPF6;
wherein when subjected to cyclic voltammetry at a plurality of cycles ranging from about 3V to about 5V and using a cathode current collector comprising aluminum versus Li/Li$^+$ electrodes the composition exhibits an oxidative corrosion current of about 0.10 mA/cm$^2$ or less for a second and subsequent cycles.

The electrolyte composition described above, wherein the organosilicon compound is selected from the group consisting of Formula I or Formula II:

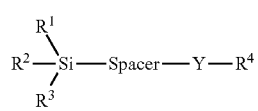

Formula I

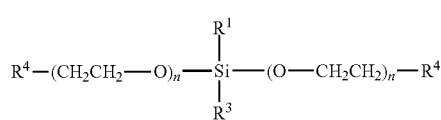

Formula II wherein R$^1$, R$^2$, and R$^3$ are the same or different and are independently selected from the group consisting of C$_1$ to C$_6$ linear or branched alkyl and halogen;

"Spacer" is selected from the group consisting of C$_1$ to C$_6$ linear or branched alkylene, alkenylene, or alkynylene, or "Spacer" is absent, provided that when "Spacer" is absent, Y is present;

Y is absent or is selected from the group consisting of —(O—CH$_2$—CH$_2$)$_n$— and

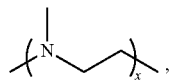

wherein each subscript "n" is the same or different and is an integer from 1 to 15, and subscript "x" is an integer from 1 to 15; and each R$^4$ is the same or different and is selected from the group consisting of cyano (—CN), cyanate (—OCN), isocyanate (—NCO), thiocyanate (—SCN) and isothiocyanate (—NCS).

The electrolyte composition wherein the organosilicon compound has a structure as shown in Formula I.

The electrolyte composition wherein the organosilicon compound has a structure as shown in Formula II.

The electrolyte composition wherein imide salt comprises a bis(trifluoromethane)sulfonamide (TFSI) anion.

The electrolyte composition further comprising lithium bis(oxalato)borate (LiBOB) or LiPF$_6$.

The electrolyte composition described in the immediately preceding paragraph, further comprising a carbonate.

The electrolyte composition described in the immediately preceding paragraph, wherein the carbonate is selected from the group consisting of ethylene carbonate (EC), dimethyl carbonate (DMC), diethyl carbonate (DEC), ethylmethyl carbonate (EMC), propylene carbonate (PC), and fluoroethylene carbonate (FEC).

The electrolyte composition as described herein comprising LiBOB.

The electrolyte composition wherein the organosilicon compound is selected from the group consisting of Formula I or Formula II:

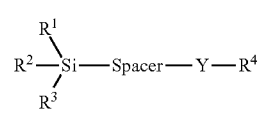

Formula I

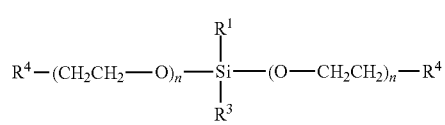

Formula II wherein R$^1$, R$^2$, and R$^3$ are the same or different and are independently selected from the group consisting of C$_1$ to C$_6$ linear or branched alkyl and halogen;

"Spacer" is selected from the group consisting of C$_1$ to C$_6$ linear or branched alkylene, alkenylene, or alkynylene, or "Spacer" is absent, provided that when "Spacer" is absent, Y is present;

Y is absent or is selected from the group consisting of —(O—CH$_2$—CH$_2$)$_n$— and

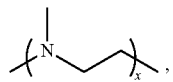

wherein each subscript "n" is the same or different and is an integer from 1 to 15, and subscript "x" is an integer from 1 to 15; and each $R^4$ is the same or different and is selected from the group consisting of cyano (—CN), cyanate (—OCN), isocyanate (—NCO), thiocyanate (—SCN) and isothiocyanate (—NCS);

the imide salt is bis(trifluoromethane)sulfonimide lithium salt (LiTFSI); and wherein the electrolyte composition further comprises lithium bis(oxalato)borate (LiBOB) or $LiPF_6$ and further comprises a carbonate.

An electrochemical device comprising an electrolyte composition as disclosed herein.

The objects and advantages of the compounds and electrolyte formulations will appear more fully from the following detailed description and accompanying drawings.

The term "organosilicon compound" and the abbreviation "OS" are synonymous and designate any organic compound comprising at least one carbon atom, hydrogen atoms, and at least one silicon atom, and which is capable of functioning in an electrolytic environment, without limitation. Organosilicon compounds may also additionally (and optionally) comprise at least one oxygen atom, at least one nitrogen atom, at least one halogen atom, and/or at least one sulfur atom. Explicitly included within the term "organosilicon" are the organosilicon compounds disclosed in U.S. Pat. Nos: 8,765,295; 8,076,032; 8,076,031; 8,027,148; 7,695,860; 7,588,859; 7,473,491, and WO 2013/16836 A1 all of which are incorporated herein by reference.

The term "OS3" is used herein to designate any compound having a structure as shown in Formulas I, II, III, VI, and V:

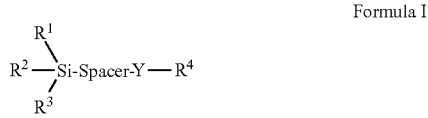

Formula I

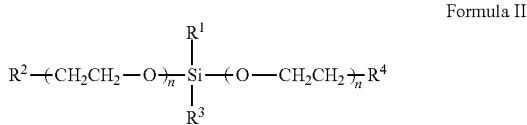

Formula II wherein $R^1$, $R^2$, and $R^3$ are the same or different and are independently selected from the group consisting of $C_1$ to $C_6$ linear or branched alkyl and halogen;

"Spacer" is absent or is selected from the group consisting of $C_1$ to $C_6$ linear or branched alkylene, alkenylene, or alkynylene, provided that when "Spacer" is absent, Y is present;

Y is absent or is selected from the group consisting of —(O—CH$_2$—CH$_2$)$_n$— and

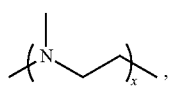

wherein each subscript "n" is the same or different and is an integer from 1 to 15, and subscript "x" is an integer from 1 to 15; and each $R^4$ is the same or different and is selected from the group consisting of cyano (—CN), cyanate (—OCN), isocyanate (—NCO), thiocyanate (—SCN) and isothiocyanate (—NCS).

Also specifically disclosed herein are compounds of Formula I, wherein "Spacer" is present, and Y is —(O—CH$_2$—CH$_2$)$_n$—. Additionally, specifically disclosed herein are compounds in which "Spacer" is present and Y is

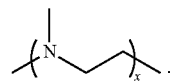

Additionally disclosed herein are compounds in which "Spacer" is absent, and Y is —O—CH$_2$—CH$_2$)$_n$—.

Also disclosed herein are compounds having a structure as shown in any of Formulas III, IV, and V:

Formula III

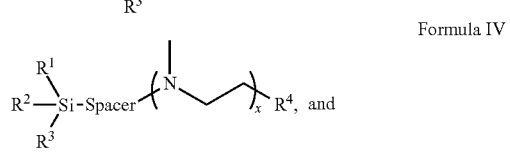

Formula IV

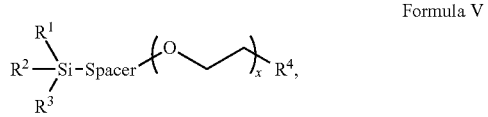

Formula V wherein $R^1$, $R^2$, and $R^3$ are the same or different and are independently selected from the group consisting of $C_1$ to $C_6$ linear or branched alkyl and halogen; "spacer" is a $C_1$ to $C_6$ linear or branched alkylene, alkenylene, or alkynylene; each $R^4$ is the same or different and is selected from the group consisting of cyano (—CN), cyanate (—OCN), isocyanate (—NCO), thiocyanate (—SCN) and isothiocyanate (—NCS); each subscript "n" is the same or different and is an integer from 1 to 15; "x" is an integer from 1 to 15. Also included herein are electrolyte compositions comprising one or more of the compounds of Formulas I through V as described herein, in combination with a salt, preferably a lithium-containing salt.

$R^1$, $R^2$, and $R^3$ may optionally be selected from the group consisting of $C_1$ to $C_3$ alkyl, chloro, and fluoro; and $R^4$ may optionally be cyano.

When the compound comprises Formula II, $R^1$ and $R^3$ may optionally be selected from the group consisting of $C_1$ to $C_3$ alkyl (or simply methyl), chloro, and fluoro. Each "n" is optionally and independently an integer from 1 to 5. $R^4$ may optionally be cyano.

When the compound comprises any of Formulas III through V, $R^1$, $R^2$, and $R^3$ may optionally be selected from the group consisting of $C_1$ to $C_3$ alkyl, chloro, and fluoro. In some versions of the Formula III-V compounds at least one of $R^1$, $R^2$, and $R^3$ is halogen; in other versions of the Formula III- V compounds at least two of $R^1$, $R^2$, and $R^3$ are halogen. The "spacer" may optionally be a $C_2$ to $C_4$ linear or branched alkylene. $R^4$ may optionally be cyano.

When the compound comprises any of Formulas III through V, $R^1$, $R^2$, and $R^3$ may optionally be selected from the group consisting of $C_1$ to $C_3$ alkyl, chloro, and fluoro. In some versions of the Formula I-V compounds at least one of $R^1$, $R^2$, and $R^3$ is halogen; in other versions of the Formula I-V compounds at least two of $R^1$, $R^2$, and $R^3$ are halogen.

The "spacer" may optionally be a $C_2$ to $C_4$ linear or branched alkylene. $R^4$ may optionally be cyano. In certain versions of the Formula II compounds, "x" may optionally be 1 to 4.

In all versions of the compounds, "halogen," includes fluoro, chloro, bromo, and iodo. Fluoro and chloro are the preferred halogen substituents. The term "lithium-containing salt" explicitly includes, but is not limited to, $LiClO_4$, $LiBF_4$, $LiAsF_6$, $LiPF_6$, $LiCF_3SO_3$, $Li(CF_3SO_2)_2N$, $Li(CF_3SO_2)_3C$, $LiN(SO_2C_2F_5)_2$, lithium alkyl fluorophosphates and lithium bis(chelato)borates.

The term "carbonate" refers to any compound, without limitation, that includes at least one $CO_3$ (i.e., O—C(=O)—O) moiety, including organic carbonates, cyclic carbonates, etc.

All of the above-disclosed compounds and any individual compound or combination of such compounds is generically designated herein as "OS" compound(s).

Also disclosed herein are electrolyte compositions comprising one or more OS compounds as recited in the preceding paragraphs in combination with an imide. Also disclosed herein are electrochemical devices comprising such electrolyte compositions. The compounds disclosed herein are highly useful for formulating electrolytes for use in charge-storage devices of all kinds (e.g., cells, batteries, capacitors, and the like).

Throughout the description, a number of shorthand abbreviations will be used to designate various organosilicon compounds more easily. The following conventions are used:

The nDnN compounds have the general formula:

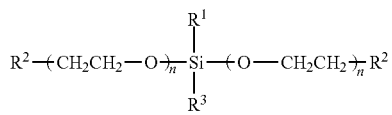

wherein $R^1$ and $R^3$ are the same or different and are independently selected from the group consisting of $C_1$ to $C_6$ alkyl, each $R^2$ is the same or different and is independently selected from the group consisting of cyano (—CN), cyanate (—OCN), isocyanate (—NCO), thiocyanate (—SCN) and isothiocyanate (—NCS), and the two subscripts "n" are integers that are the same or different and independently range from 1 to 15. Thus, for example, 1ND1N is the compound wherein $R^1$ and $R^3$ are methyl (i.e., $C_1$) and both subscripts "n" are 1.

The $FnS_nMN$ compounds have the general formula:

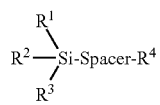

wherein $R^1$, $R^2$, and $R^3$ are the same or different and are independently selected from the group consisting of $C_1$ to $C_6$ alkyl (preferably methyl) and halogen (preferably F), "spacer" is a C1 to C6 linear or branched divalent hydrocarbon (i.e., alkylene, alkenylene, alkynylene), and $R^4$ is selected from the group consisting of cyano (—CN), cyanate (—OCN), isocyanate (—NCO), thiocyanate (—SCN) and isothiocyanate (—NCS). The compounds designated SnMN have the same structure, wherein $R^1$, $R^2$, and $R^3$ are the same or different and are independently selected from the group consisting of $C_1$ to $C_6$ alkyl (preferably methyl).

Related compounds disclosed herein have the structures:

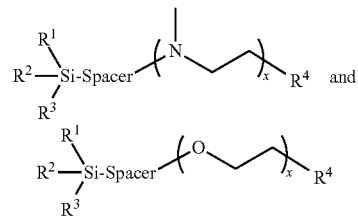

wherein $R^1$, $R^2$, and $R^3$ are the same or different and are independently selected from the group consisting of $C_1$ to $C_6$ alkyl (preferably methyl) and halogen (preferably F), "spacer" is a C1 to C6 linear or branched divalent hydrocarbon (i.e., alkylene, alkenylene, alkynylene), $R^4$ is selected from the group consisting of cyano (—CN), cyanate (—OCN), isocyanate (—NCO), thiocyanate (—SCN) and isothiocyanate (—NCS), and "x" is an integer of from 1 to 15, preferably from 1 to 4.

The compounds disclosed herein can be made by a number of different routes. A general approach that can be used to fabricate the compounds is as follows:

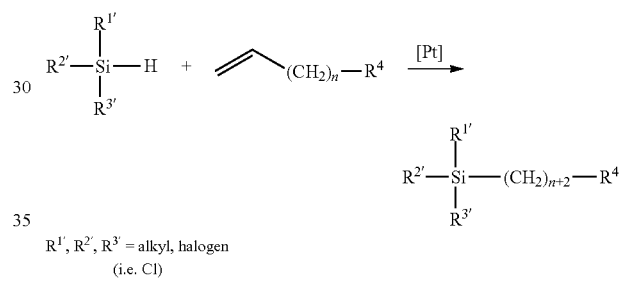

$R^{1'}$, $R^{2'}$, $R^{3'}$ = alkyl, halogen
(i.e. Cl)

The various R groups are as defined herein; "n" is a positive integer.

The compounds disclosed herein can also be fabricated via the following approach:

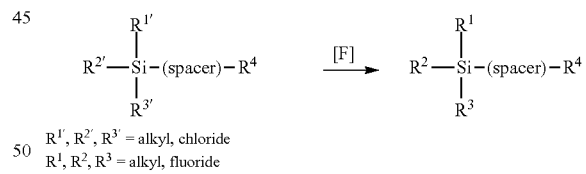

$R^{1'}$, $R^{2'}$, $R^{3'}$ = alkyl, chloride
$R^1$, $R^2$, $R^3$ = alkyl, fluoride The compounds disclosed herein are also made by a number of specific routes, including the following reaction schemes:

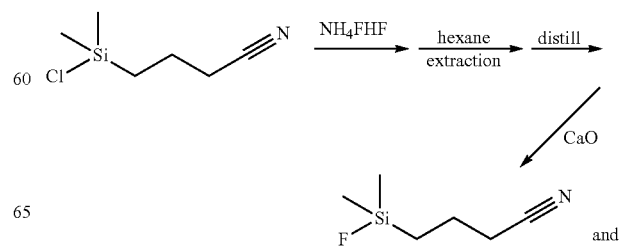

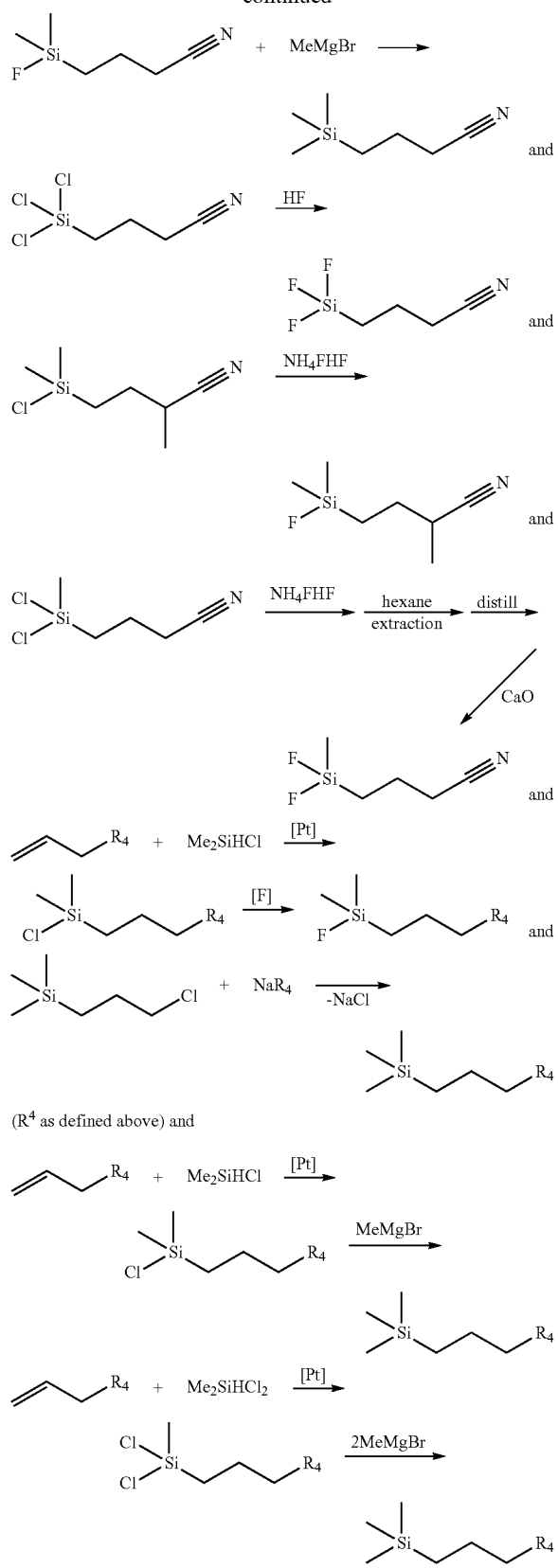

(R⁴ as defined above) and

An "imide" is defined herein to be a compound comprising two acyl groups bonded to a nitrogen atom, i.e.:

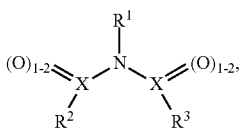

wherein $R^1$, $R^2$, and $R^3$ are the same or different can be a very wide variety of atoms, including hydrogen, halogen, metals, aliphatic groups (substituted or unsubstituted; linear, branched, or cyclic), aryl groups (substituted or unsubstituted), carbonates, cyclic carbonates, etc. $R^1$ may also be absent, in which case the central nitrogen atom will bear a negative charge and can form salts. "X" is any atom that will support at least one acyl group, such as carbon (which will support only one acyl group per carbon atom) or sulfur, which can support two acyl groups per sulfur atom (i.e., X and its attendant acyl moieties define a sulfone group).

An "imide salt" is any salt containing an "imide" as defined herein. As used in this context "salt" has its conventional meaning of a chemical compound formed from the reaction of an acid with a base. An exemplary imide salt that can be used in the present electrolyte compositions include Lithium bis(trifluoromethanesulfonyl)imide (LiTFSI) (i.e., bis(trifluoromethane)sulfonimide lithium salt, Sigma-Aldrich Catalog No. 449504). LiTFSI is a commercial product supplied by several international suppliers:

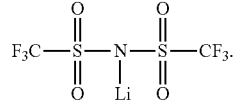

The TFSI anion forms a great many other imide salts, which are explicitly included within the scope of the term "imide salt," including imide salts that are sometimes referred to as "ionic liquids," including the following:

Tetrabutylammonium bis-trifluoromethanesulfonimidate (Fluka Catalog No. 86838):

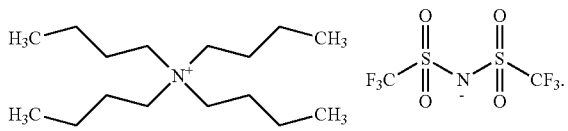 [SMILES: CCCC[N+](CCCC)(CCCC)CCCC ; O=S(=O)(NS(=O)(=O)C(F)(F)F)C(F)(F)F]

1-Ethyl-3-methylimidazolium bis(trifluoromethylsulfonyl) imide (Fluka Catalog No. 11291)

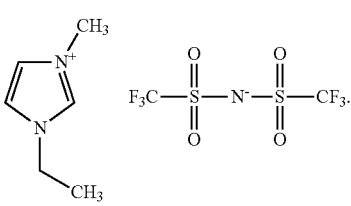

Diethylmethyl(2-methoxyethyl)ammonium bis(trifluoromethylsulfonyl)imide (Sigma-Aldrich Catalog No. 727679):

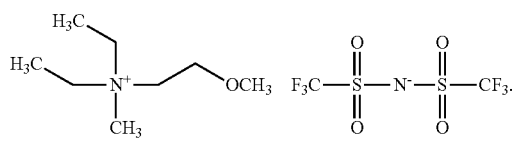

Methyl-trioctylammonium bis(trifluoromethylsulfonyl) imide (Fluka Catalog No. 00797)

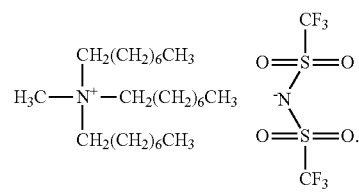

Triethylsulfonium bis(trifluoromethylsulfonyl)imide (Fluka Catalog No. 8748)

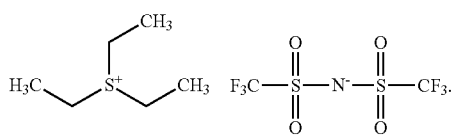

Additional examples of imide salts that can be used herein are described in the scientific literature. See, for example, *J. Phys. Chem. B* 2005, 109, 21576-21585, which describes imide salts having the following structure:

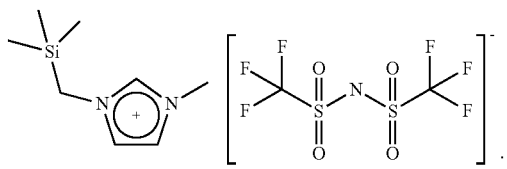

See also *J. Phys. Chem. B* 2007, 111, 4819-4829.

Structurally related imide salts are also described in *Chem. Commun.*, 2011, 47, 11969-11971:

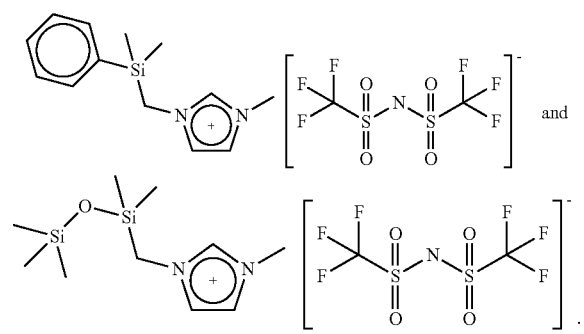

Still further imide salts are described in *Ionics* (2014) 20:1207-1215, and may be used in the compositions disclosed and claimed herein, including:

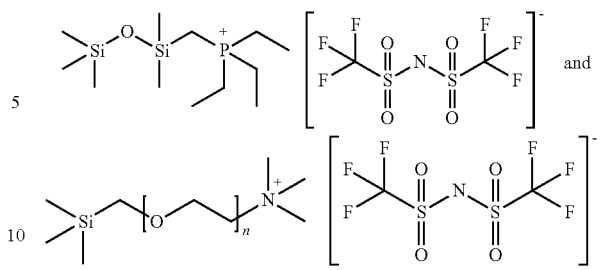

$n = 1, 2, 3$

"LiBOB" refers to lithium bis(oxalato)borate:

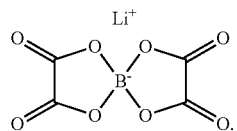 [SMILES: [Li+] ; O=C1O[B-]2(OC1=O)OC(=O)C(=O)O2]

The elements and method steps described herein can be used in any combination whether explicitly described or not.

All combinations of method steps as used herein can be performed in any order, unless otherwise specified or clearly implied to the contrary by the context in which the referenced combination is made.

As used herein, the singular forms "a," "an," and "the" include plural referents unless the content clearly dictates otherwise.

Numerical ranges as used herein shall include every number and subset of numbers contained within that range, whether specifically disclosed or not. Further, these numerical ranges shall be construed as providing support for a claim directed to any number or subset of numbers in that range. For example, a disclosure of from 1 to 10 shall be construed as supporting a range of from 2 to 8, from 3 to 7, from 5 to 6, from 1 to 9, from 3.6 to 4.6, from 3.5 to 9.9, and so forth.

It is understood that the compounds and compositions disclosed herein are not confined to the particular construction and arrangement of parts herein illustrated and described, but embraces such modified forms thereof as come within the scope of the claims.

One class of organosilicon compounds that can be used in the disclosed electrolyte compositions are organosilicon compounds having a shared structural feature in the form of one or more terminal substituents that comprise a carbon-nitrogen double or triple bond, such as a cyano (R—C≡N), cyanate (R—O—C≡N), isocyanate (R—N═C═O), thiocyanate (R—S—C≡N), and/or isothiocyanate (R—N═C═S). Included among the preferred compounds are the following structures:

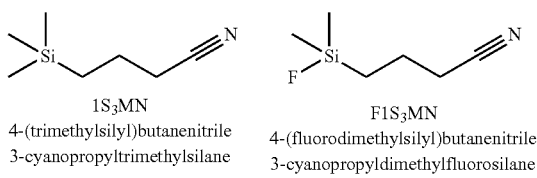

1S₃MN
4-(trimethylsilyl)butanenitrile
3-cyanopropyltrimethylsilane

F1S₃MN
4-(fluorodimethylsilyl)butanenitrile
3-cyanopropyldimethylfluorosilane

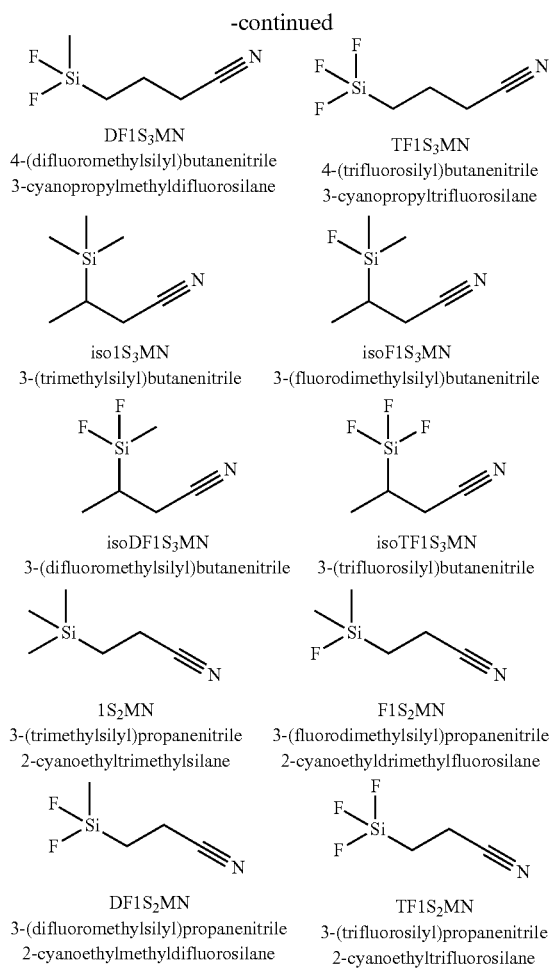

Of particular note in the present electrolytes is a wholly unexpected synergism when OS compounds are formulated with imides compounds in general, lithium-containing imides salts, and LiTFSI in particular, both in the presence or absence of additional carbonate additives. Electrolyte compositions comprising OS compounds admixed with imide salts exhibit unexpectedly improved electrochemical and thermal properties. Thus, disclosed herein are improved electrolytes comprising an OS compound in combination with an imide.

Referring now to the drawings, it has been found that imide salts, when blended with OS compounds, yield electrolyte compositions having lower aluminum oxidation potentials as compared to electrolytes consisting of an OS compound in combination with just carbonate additives. As discussed below, the combination of OS compounds and LiTFSI shows a synergistic effect in DSC testing with NMC with LiTFSI at OS concentrations from about 0.1M to about 1.0M. (Concentrations above and below this range are explicitly within the scope of the attached claims.) This result indicates fundamental properties for improved abuse resistance in full cells and other electrochemical devices. Imide salts have been used in lithium ion batteries in the past. However, their use has been limited due to pronounced aluminum corrosion and electrochemical breakdown at higher voltages when used in conjunction with carbonate-only electrolytes. The electrolytes described herein, namely, OS compound(s) in combination with imide salts enable imide salt-containing electrolytes to achieve greatly improved thermal and electrochemical stability in lithium ion batteries and other electrochemical devices.

Figure 1:
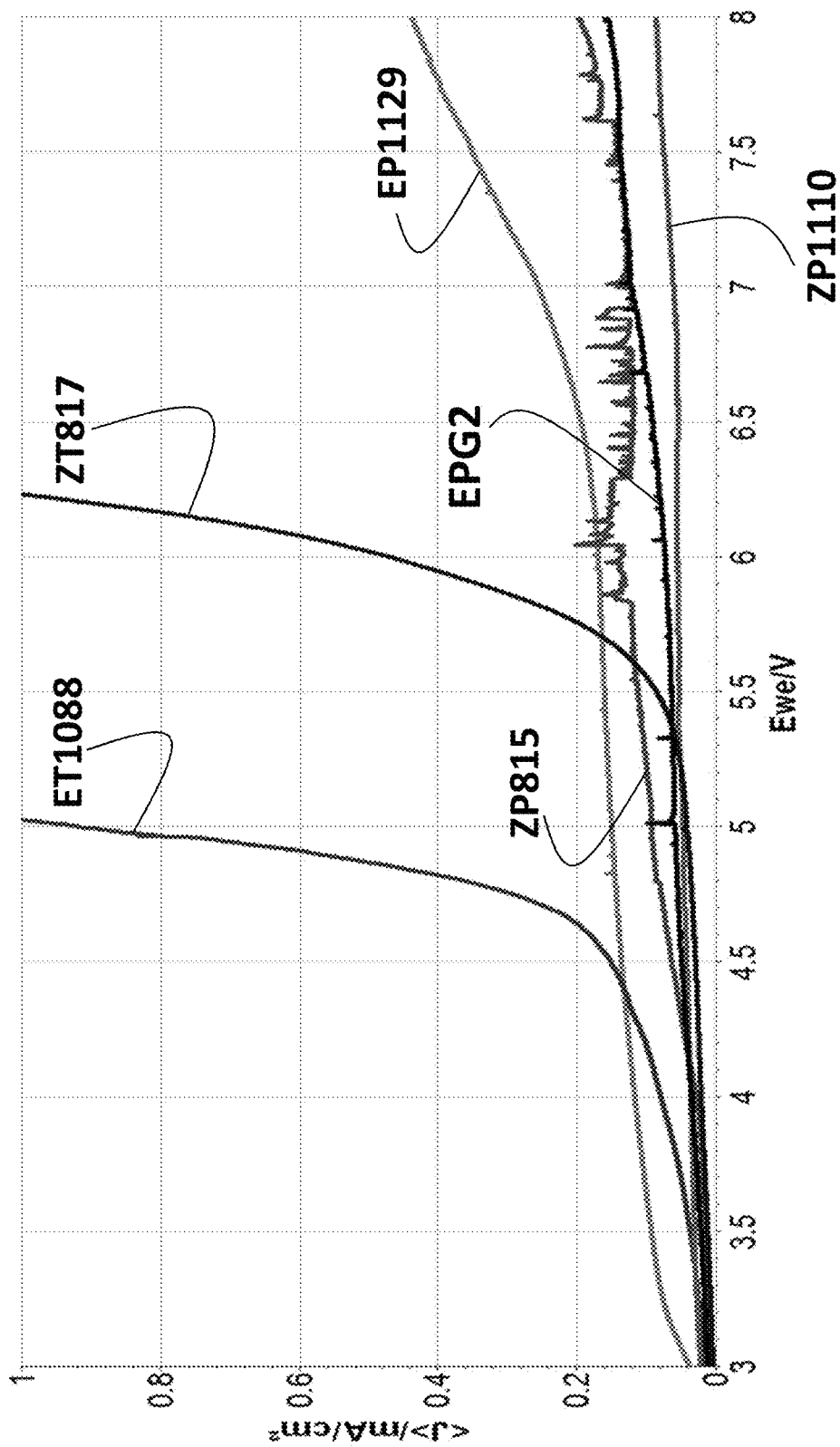
FIG. 1 presents a series of traces recording current (mA/cm²) versus potential $E_{we}$/V for various organosilicon electrolyte compositions (see text for details). The traces were generated using a 1.5 mm Al working electrode ("we") in a conventional 3-electrode arrangement.

FIG. 1 illustrates the increased Al oxidation potentials exhibited by the electrolyte compositions disclosed herein. FIG. 1 presents a series of traces recording current (mA/cm$^2$) versus potential $E_{we}$/V for various organosilicon electrolyte compositions. The traces were generated using a 1.5 mm Al working electrode ("we") in a conventional 3-electrode arrangement. (All of the cyclic voltammetry data presented herein was gathered using this same 1.5 mm Al working electrode.) The electrolyte compositions tested include OS compounds in combination with carbonate additives and LiTFSI and LiPF$_6$. Of particular relevance in FIG. 1 is that the lowest Al corrosion seen among the compositions tested was for 0.25M LiTFSI and OS. Additionally, the OS+LiTFSI had lower corrosion rates than compositions consisting only of carbonates with LiTFSI salt, and carbonate blended with LiTFSI+LiPF$_6$ salts. The various electrolyte compositions tested are summarized in Table 1.1. The resulting oxidation voltages are presented in Table 1.2. Table 1.3 matches the various electrolyte compositions tested to the figures in which the results of the testing are presented.

TABLE 1.1

Electrolyte compositions tested.
Electrolyte Composition

| | solvents | |
|---|---|---|
| salts | F1S$_3$MN | EC/EMC (3/7v) |
| 1M LiPF$_6$ | ZP815 | EPG2 |
| 1M LiTFSI | ZT817 | ET1088 |
| 0.25M LiTFSI + 0.75M LiPF$_6$ | ZP1110 | EP1129 |

TABLE 1.2

Oxidation voltage:

| Electrolyte | Oxidation Voltage @ 1 mA/cm$^2$ |
|---|---|
| EPG2-03 | >8 V |
| ET1088-01 | 5.0 V |
| EP1129-01 | >8 V |
| ZP815-17 | >8 V |
| ZT817-02 | 6.2 V |
| ZP1110-01 | >8 V |

TABLE 1.3

Electrolyte compositions by electrolyte code as used in the figures

| FIG. | electrolyte code | Solvents | Salts | Additives |
|---|---|---|---|---|
| 1 | ET1088 | EC/EMC: 30/70 vol % | 1M LiTFSI | none |

TABLE 1.3-continued

Electrolyte compositions by electrolyte code as used in the figures

| FIG. | electrolyte code | Solvents | Salts | Additives |
|---|---|---|---|---|
|  | ZT817 | 100% F1S$_3$MN | 1M LiTFSI | none |
|  | ZP815 | 100% F1S$_3$MN | 1M LiPF$_6$ | none |
|  | EPG2 | EC/EMC: 30/70 vol % | 1.2M LiPF$_6$ | none |
|  | EP1129 | EC/EMC: 30/70 vol % | 0.25M LiTFSI + 0.75M LiPF$_6$ | none |
|  | ZP1110 | 100% F1S$_3$MN | 0.25M LiTFSI + 0.75M LiPF$_6$ | none |
| 8 | (1) EP1094 | EC/EMC: 30/70 vol % | 0.25M LiTFSI + 0.75M LiPF$_6$ | 2% VC |
|  | (2) EPG6 | EC/EMC: 30/70 vol % | 1M LiPF$_6$ | 2% VC + 0.05M LiBOB |
|  | (3) ZP1102 | F1S$_3$MN/EC/DEC: 2/2/6 vol % | 0.25M LiTFSI + 0.75M LiPF$_6$ | 2% VC + 0.05M LiBOB |
|  | (4) ZP967 | F1S$_3$MN/EC/EMC: 2/2/6 vol % | 1M LiPF$_6$ | 2% VC + 0.05M LiBOB |
|  | (5) ZP1132 | F1S$_3$MN/EMC: 5/5 vol % | 0.25M LiTFSI + 0.75M LiPF$_6$ | 2% VC + 0.05M LiBOB |
|  | (6) ZP937 | F1S$_3$MN/EMC: 5/5 vol % | 1M LiPF$_6$ | 2% VC + 0.05M LiBOB |
|  | (7) ZP1131 | F1S$_3$MN/EC: 8/2 vol % | 0.25M LiTFSI + 0.75M LiPF$_6$ | 2% VC + 0.05M LiBOB |
|  | (8) ZP826 | F1S$_3$MN/EC: 8/2 vol % | 1M LiPF$_6$ | 2% VC + 0.05M LiBOB |
| 12 | ZT1534 | 98% F1S$_3$MN | 1M LiTFSI | 2% VC + 0.1M LiDFOB |
|  | ZT1529 | F1S$_3$MN/EC: 78/20 vol % | 1M LiTFSI | 2% VC + 0.05M LiBOB |
|  | ZP826 | F1S$_3$MN/EC: 78/20 vol % | 1M LiPF$_6$ | 2% VC + 0.05M LiBOB |
|  | ZP1533 | 98% F1S$_3$MN | 1M LiPF$_6$ | 2% VC + 0.1M LiDFOB |
| 13 | XT1532 | 98% F1S$_3$M2 | 1M LiTFSI | 2% VC + 0.1M LiDFOB |
|  | XT1530 | F1S$_3$M2/EC: 78/20 vol % | 1M LiTFSI | 2% VC + 0.05M LiBOB |
|  | XP1531 | 98% F1S$_3$M2 | 1M LiPF$_6$ | 2% VC + 0.1M LiDFOB |
|  | XP490 | F1S$_3$M2/EC: 79/20 vol % | 1M LiPF$_6$ | 1% VC + 0.05M LiBOB |
| 9A | EPG2 | EC/EMC: 30/70 vol % | 1.2M LiPF$_6$ | none |
|  | ET1088 | EC/EMC: 30/70 vol % | 1M LiTFSI | none |
|  | EP1129 | EC/EMC: 30/70 vol % | 0.25M LiTFSI + 0.75M LiPF$_6$ | none |
| 9B | EPG2 | EC/EMC: 30/70 vol % | 1.2M LiPF$_6$ | none |
|  | ZP815 | 100% F1S$_3$MN | 1M LiPF$_6$ | none |
|  | ZP817 | 100% F1S$_3$MN | 1M LiTFSI | none |
|  | ZP1110 | 100% F1S$_3$MN | 0.25M LiTFSI + 0.75M LiPF$_6$ | none |
| 11 | EP1173 | EC/EMC/DEC (3/3.5/3.5v) | 0.1M LiTFSI + 1M LiPF$_6$ | 1% VC, 1% PS 0.1M LiBOB, 0.1M LiDFOB |
|  | ZP1168 | F1S$_3$MN/EC/EMC/DEC (2/2/3/3v) | 0.1M LiTFSI + 1M LiPF$_6$ | 1% VC, 1% PS 0.1M LiBOB, 0.1M LiDFOB |

Figure 2A:
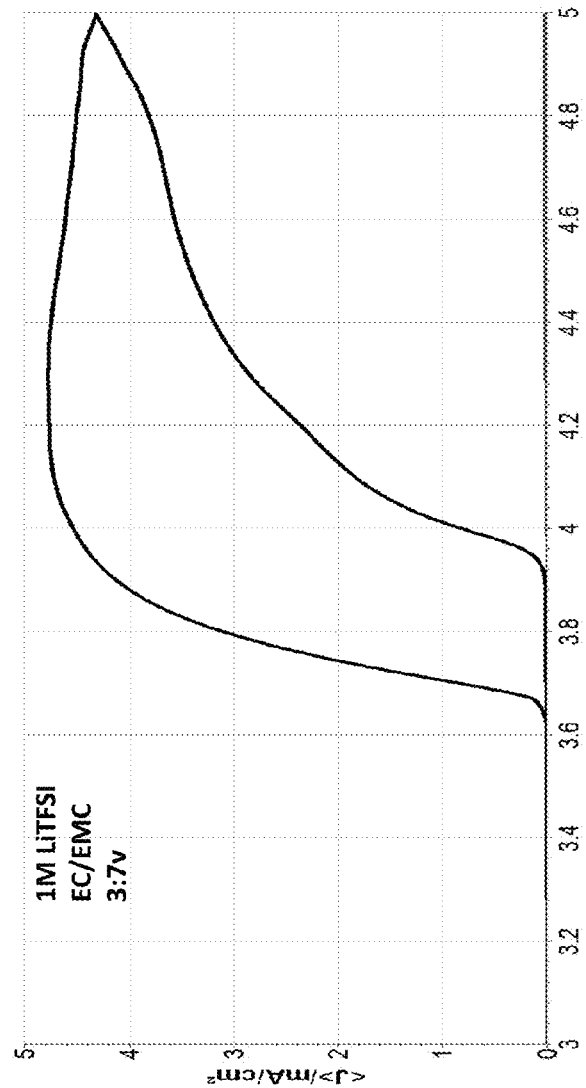
FIG. 2A is a cyclic voltammogram trace taken at 30° C. using the 3-electrode arrangement of FIG. 1 (1.5 mm Al working electrode), with an electrolyte composition comprising 1M LiTFSI and EC/EMC; the trace records the 10$^{th}$ cycle.
Figure 2B:
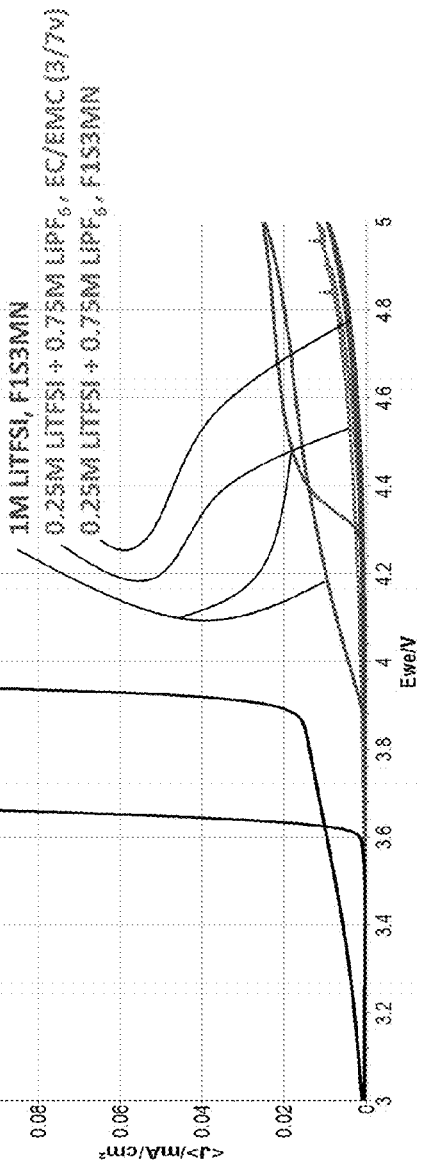
FIG. 2B presents a series of traces recording current (mA/cm²) versus potential $E_{we}$/V for various organosilicon electrolyte compositions versus an Al working electrode (see text for details). The trace was recorded at 30° C.

FIGS. 2A and 2B illustrate that electrolyte compositions comprising OS3 combined with LiTFSI are stable with Al and do not show oxidative pitting corrosion (which is a problem with carbonate/OS electrolytes). FIG. 2A is a cyclic voltammogram trace taken at 30° C. using the 3-electrode arrangement of FIG. 1 (1.5 mm Al working electrode), with an electrolyte composition comprising 1M LiTFSI and EC/EMC; the trace records the $10^{th}$ cycle. FIG. 2B presents a series of traces recording current (mA/cm$^2$) versus potential $E_{we}$/V for various organosilicon electrolyte compositions versus an Al working electrode (see text for details). The trace was recorded at 30° C. All measurements were taken with a 1.5 mm Al working electrode in a conventional 3-electrode cell, on the 10th cycle. FIG. 2A depicts the results for 1M LiTFSI+EC/EMC (3:7v). FIG. 2A depicts the results for:

1) 1M LiTFSI+F1S$_3$MN
2) 0.25M LiTFSI+0.75M LiPF$_6$+EC/EMC (3/7v)
3) 0.25M LiTFSI+0.75M LiPF$_6$+F1S$_3$MN

Figure 3A:
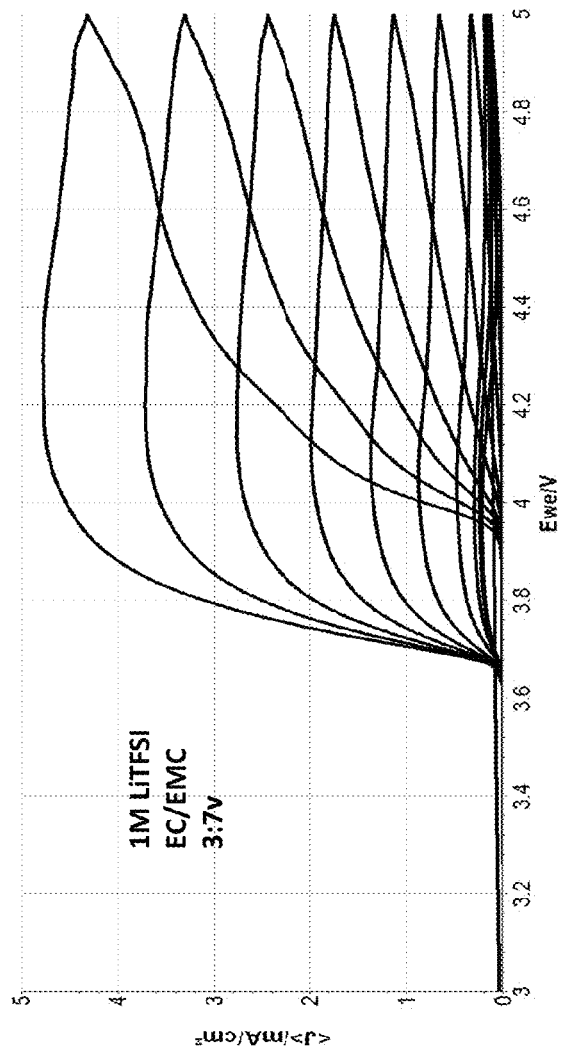
FIG. 3A, FIG. 3B, FIG. 3C, and FIG. 3D are a series of voltammograms taken at 30° C. comparing the performance of the organosilicon- and imide-containing electrolytes disclosed herein versus the corresponding carbonate-containing electrolytes. See text for complete details.
Figure 3B:
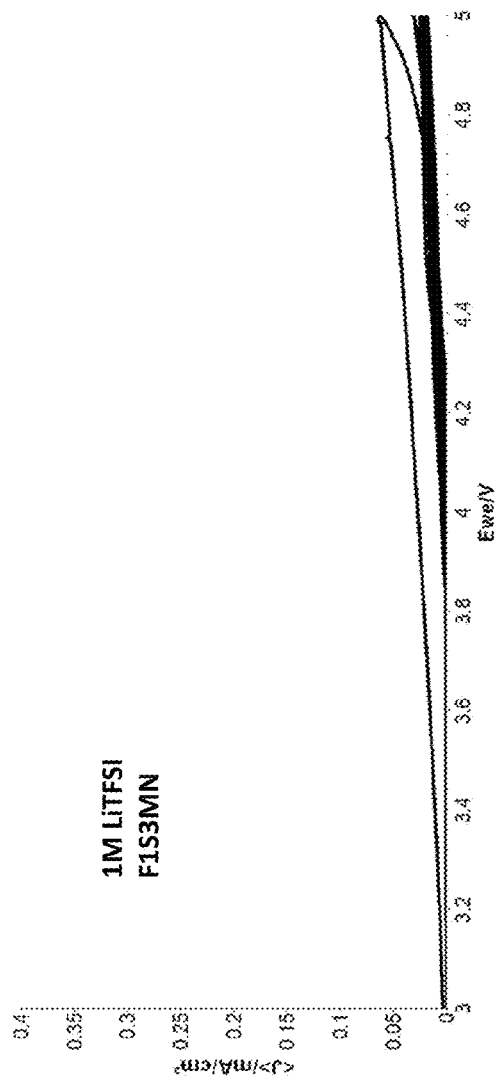
Figure 3C:
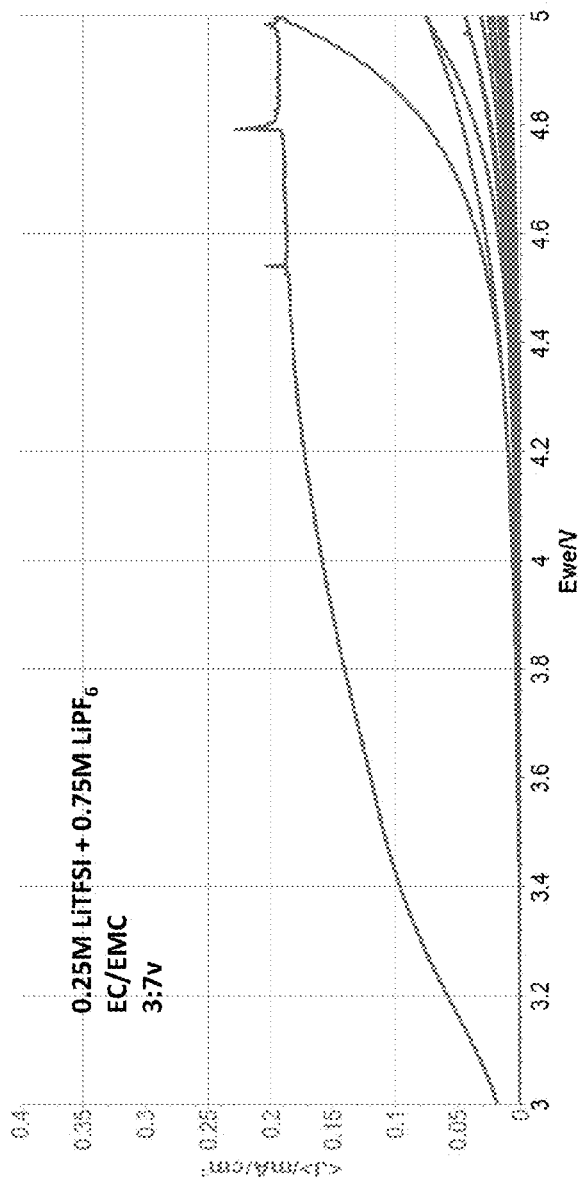
Figure 3D:
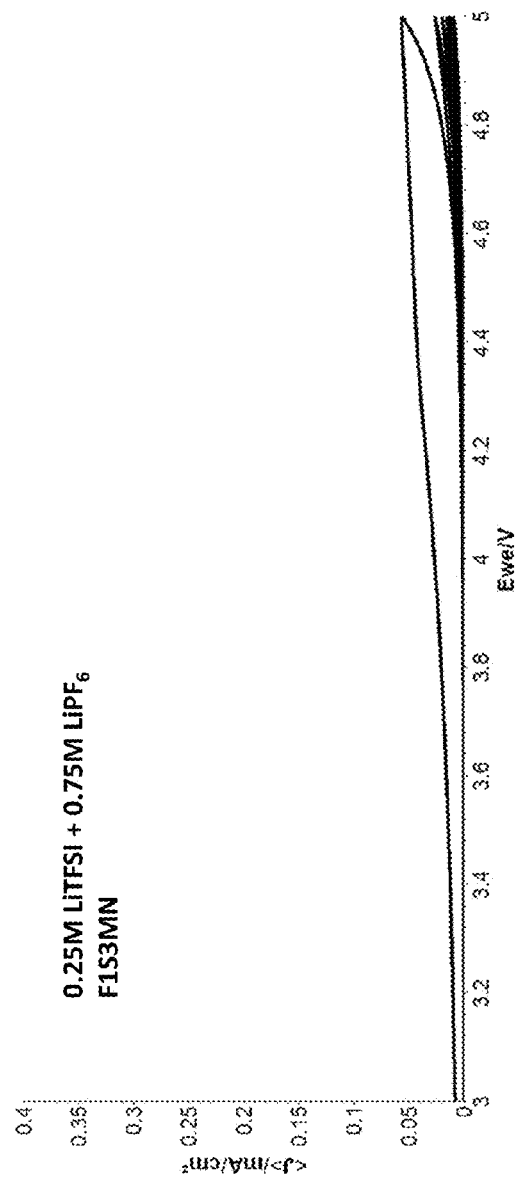

FIG. 3A, FIG. 3B, FIG. 3C, and FIG. 3D are a series of voltammograms taken at 30° C. comparing the performance of the organosilicon- and imide-containing electrolytes disclosed herein versus the corresponding carbonate-containing electrolytes. The 3-electrode cell described earlier was used to generate the data. This series of graphs clearly shows that aluminum oxidation is reduced with the OS3/imide solvent system disclosed herein as compared to carbonate-only/imide systems. FIG. 3A shows the results for 1M LiTFSI+EC/EMC, 3:7v. FIG. 3B shows the results for 1M LiTFSI+F1S₃MN. FIG. 3C shows the results for 0.25M LiTFSI+0.75M LiPF₆+EC/EMC, 3:7v. FIG. 3D shows the results for 0.25M LiTFSI+0.75M LiPF₆+F1S₃MN.

Figure 4C:
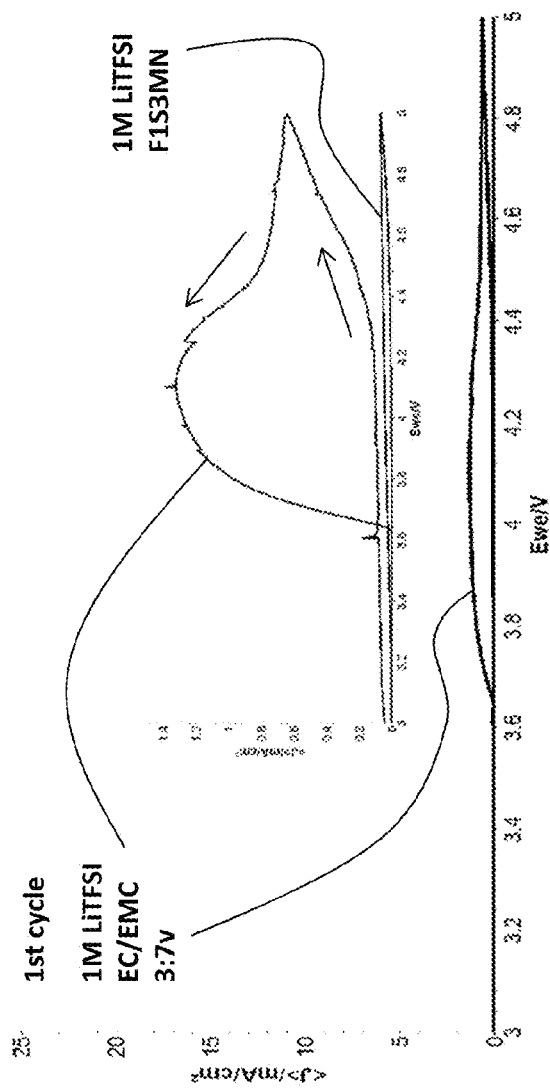
Figure 4D:
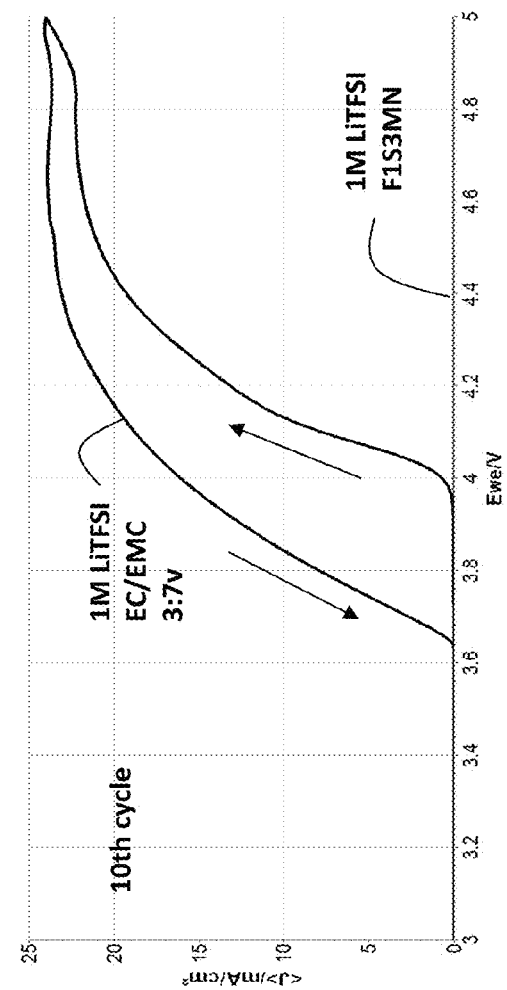

The series of traces depicted in FIGS. 4A, 4B, 4C, 4D correspond to those in FIGS. 3A, 3B, 3C, and 3D, but were conducted at 50° C. (rather than 30° C.). FIG. 4A shows the results for 1M LiTFSI+EC/EMC, 3:7v. FIG. 4B shows the results for 1M LiTFSI+F1S₃MN. FIG. 4C shows the first cycle of 1M LiTFSI+EC/EMC (3:7v) superimposed on top of the corresponding trace for 1M LiTFSI+F1S₃MN. FIG. 4D depicts the same traces as in FIG. 4C at the 10$^{th}$ cycle.

Figure 5:
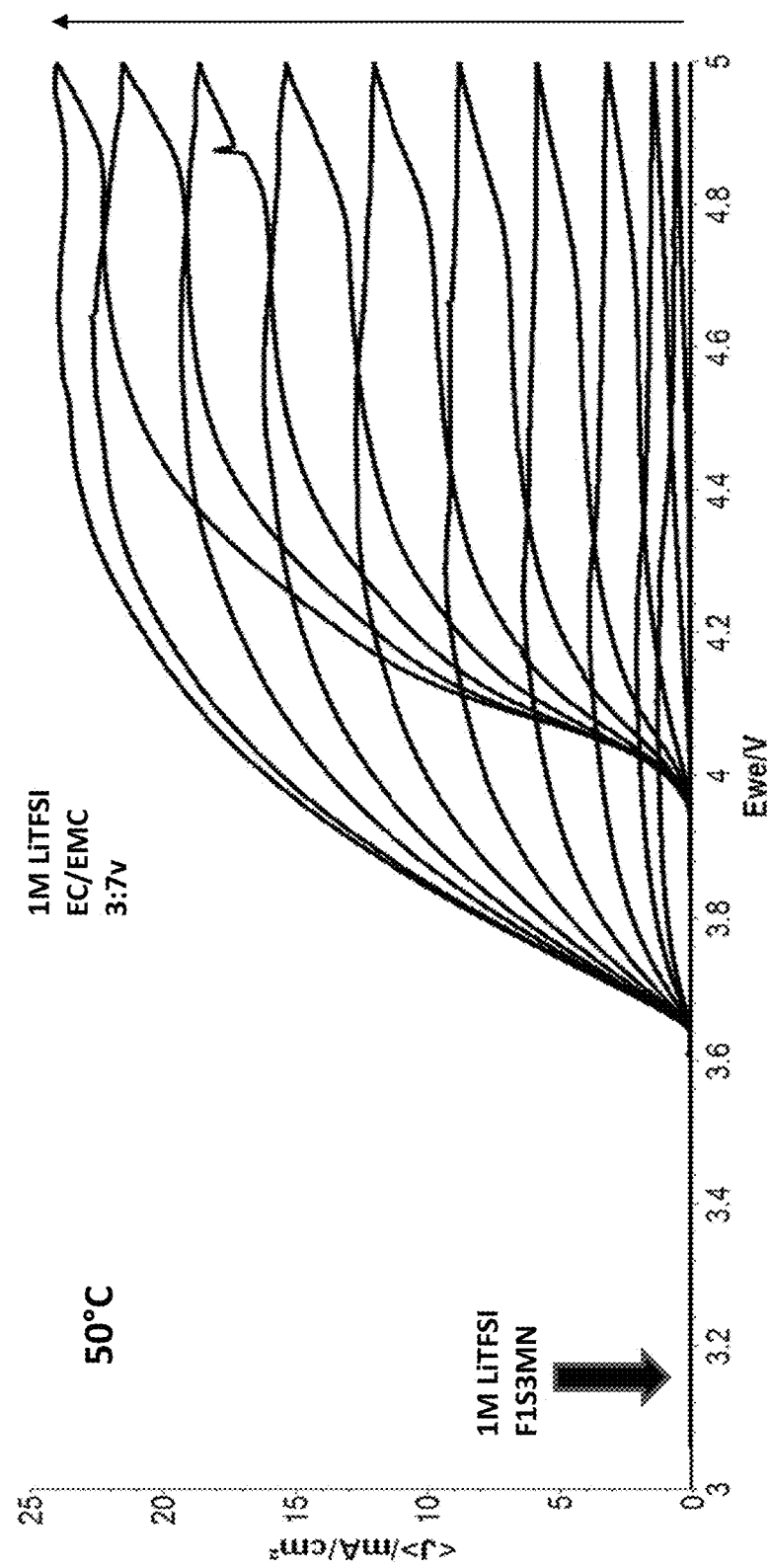
FIG. 5 is a series of cyclic voltammograms for 1M LiTFSI+EC/EMC electrolytes and 1M LiTFSI/F1S3MN electrolytes using a conventional 3-electrode cell with a 1.5 mm Al working electrode taken at 50° C.; 10 cycles are recorded.

FIG. 5 further illustrates the oxidative stability of Al at 50° C. when using the disclosed OS3 and carbonate electrolytes combined with LiTFSI. FIG. 5 clearly shows that OS3 electrolyte shows great advantage over carbonate in a LiTFSI system, especially at 50° C. The figure shows superimposed voltammograms for 1M LiTFSI+EC/EMC electrolytes and 1M LiTFSI/F1S₃MN electrolytes using a conventional 3-electrode cell with a 1.5 mm Al working electrode taken at 50° C.; 10 cycles are recorded.

Figure 6C:
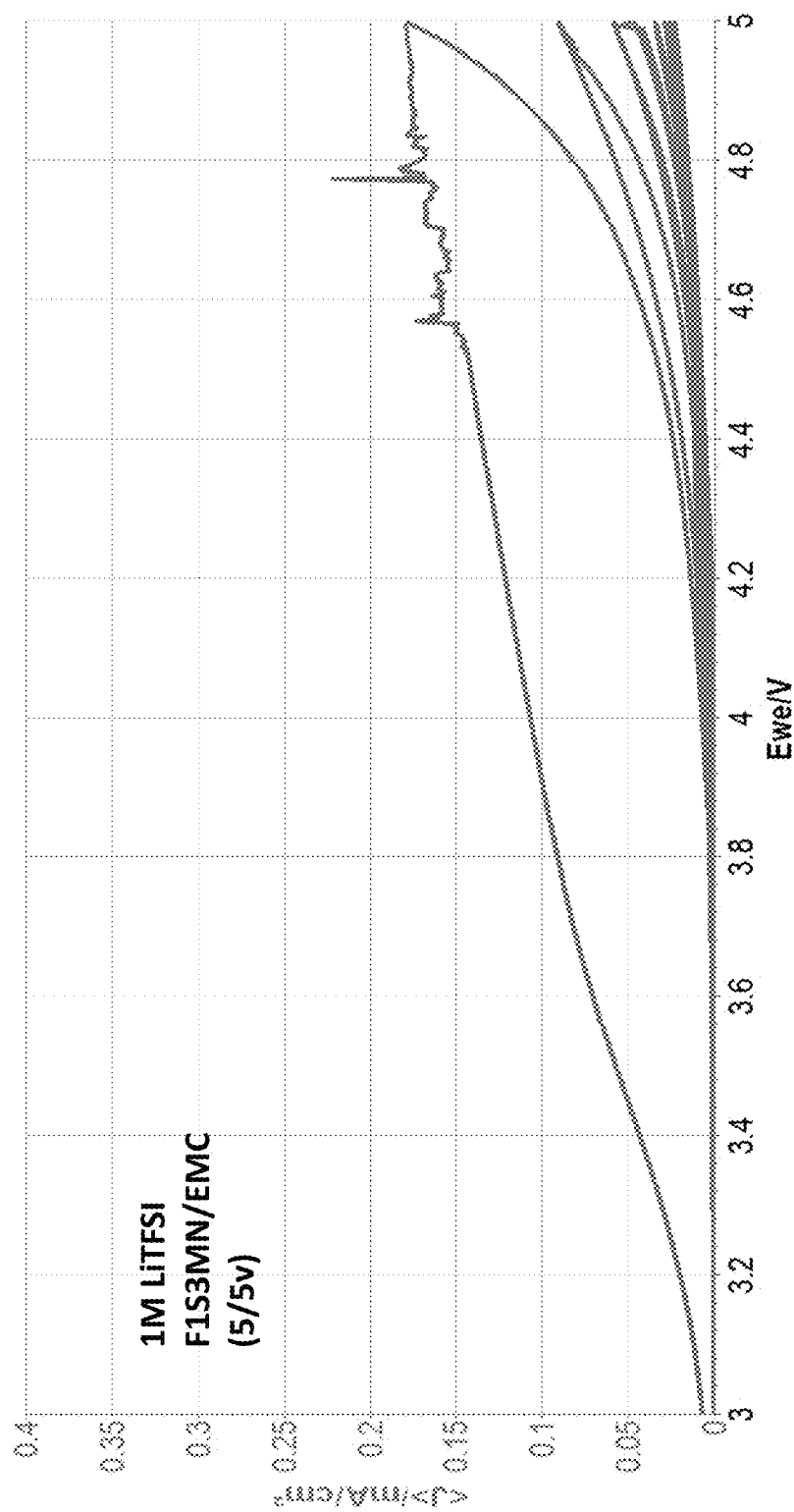

FIGS. 6A, 6B, and 6C illustrate the oxidative stability of Al at 30° C. when using the electrolyte composition disclosed herein. In short, reduced aluminum oxidation was also observed when OS3 compounds were blended with EMC and LiTFSI. The current density during the first cycle increases with the amount of EMC blended with OS3. After 10 cycles, the current densities decrease to the same level. FIG. 6A is the trace for 1M LiTFSI+F1S₃MN. FIG. 6B is the trace for 1M LiTFSI+F1S₃MN/EMC (8/2v). FIG. 6C is the trace for 1M LiTFSI+F1S₃MN/EMC (5/5v).

Figure 7C:
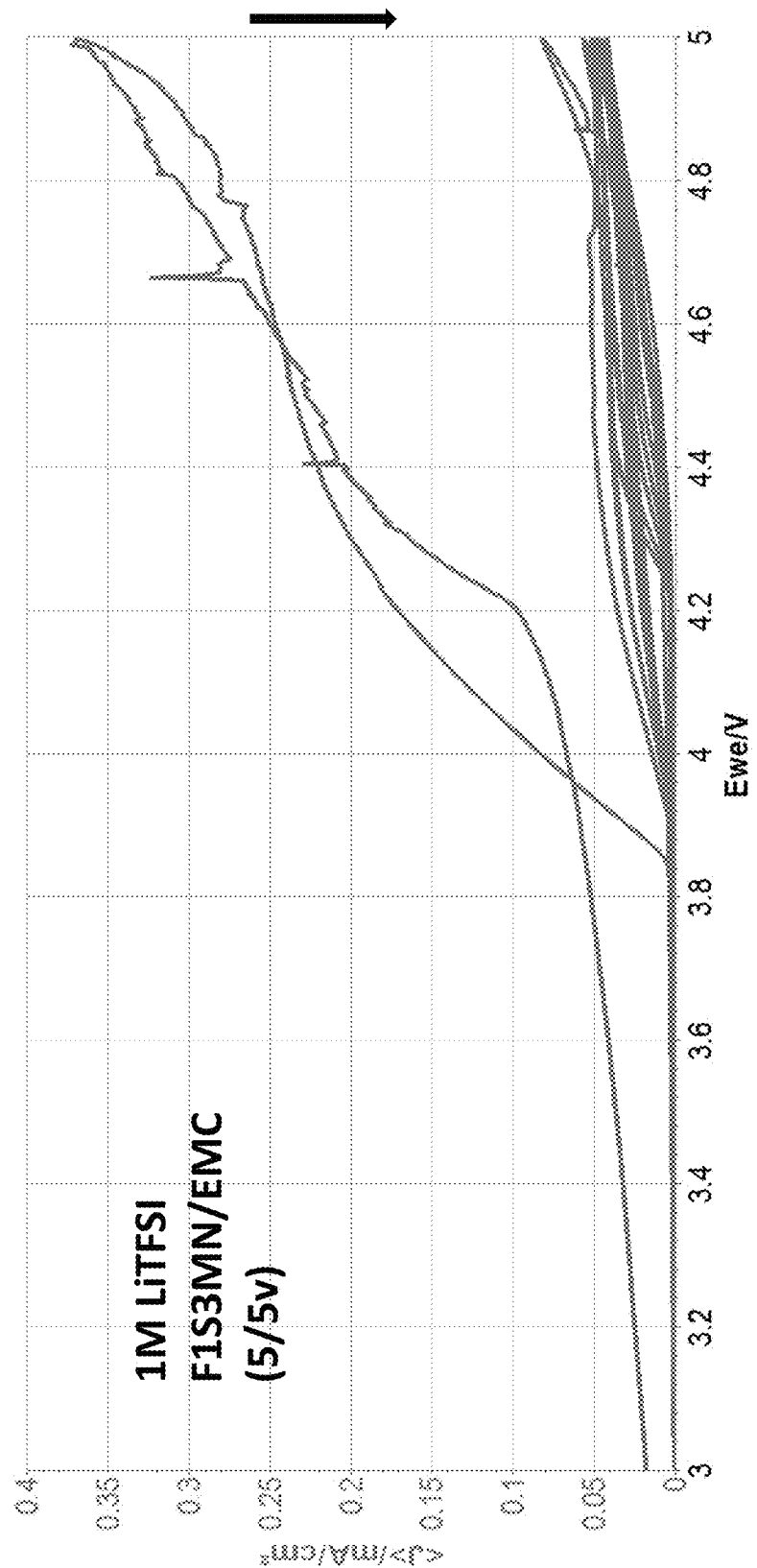

FIGS. 7A, 7B, and 7C correspond to the results shown in FIGS. 6A, 6B, and 6C, but run at 50° C. FIG. 7A is the trace for 1M LiTFSI+F1S₃MN. FIG. 7B is the trace for 1M LiTFSI+F1S₃MN/EMC (8/2v). FIG. 7C is the trace for 1M LiTFSI+F1S₃MN/EMC (5/5v). As evidenced by these figures, reduced Al oxidation was also observed when OS is blended with EMC and LiTFSI. As in the results at 30° C., at 50° C., the current density during the first cycle increases with the amount of EMC blended with OS3. After 10 cycles, the current densities decrease to the same level.

The electrolyte compositions disclosed herein also display unexpected improved thermal stability. The thermal stability of various exemplary compositions was tested using differential scanning calorimetry (DSC) to evaluate their robustness with respect to elevated temperatures.

Figure 8:
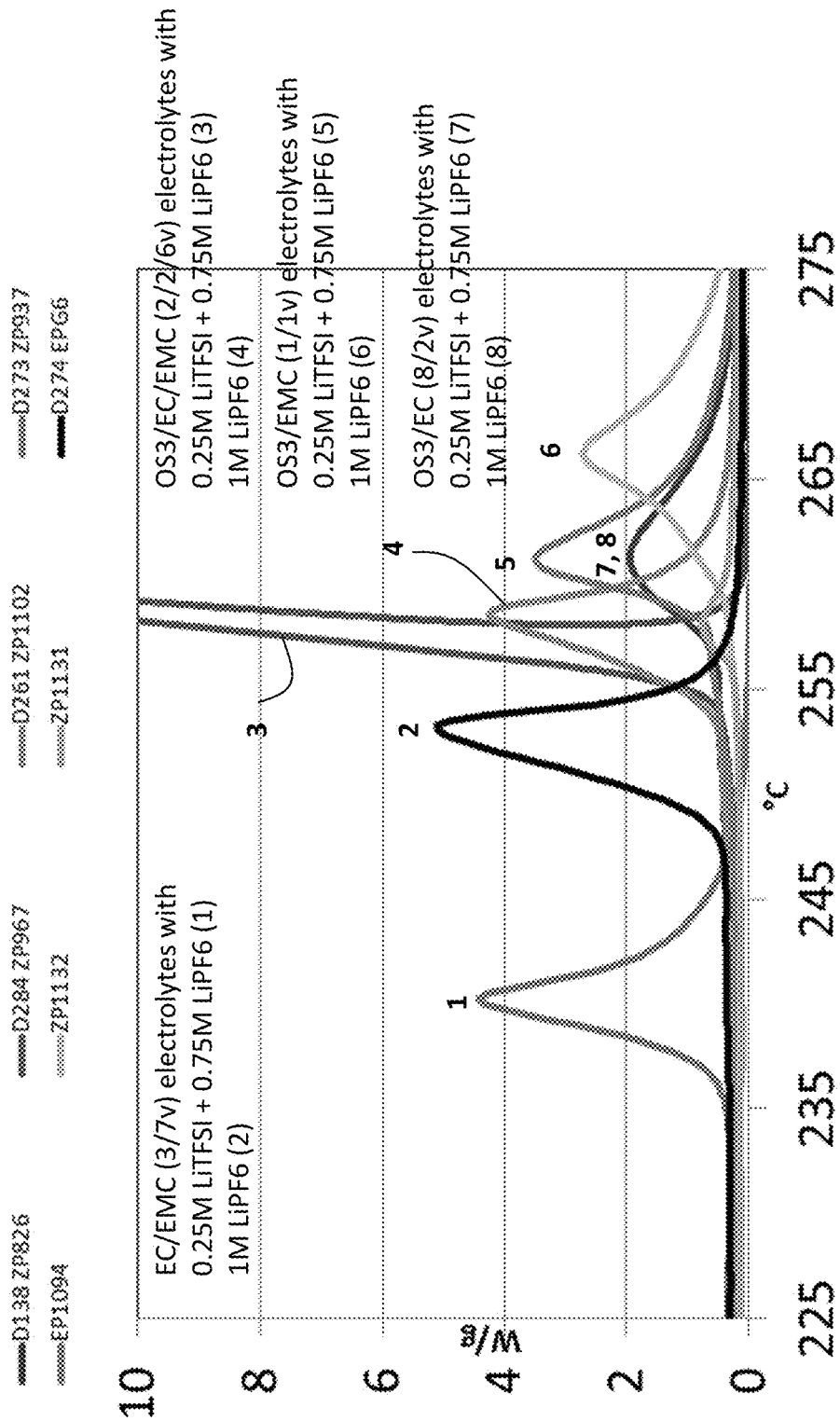
FIG. 8 depicts the results of differential scanning calorimetry ("DSC") analysis using delithiated commercial Nickel-Cobalt-Aluminum ("NCA") cathode material in the presence of various electrolytes. See text for full details.

FIG. 8, for example, is a DSC thermal safety evaluation. Delithiated NCA cathode material was evaluated in presence of various electrolyte compositions described herein. The combination of OS3 and LiTFSI showed synergistic improvement in DSC testing with NCA at 0.25M LiTFSI concentration. The following formulations were tested:
EC/EMC (3/7v) electrolytes with 0.25M LiTFSI+0.75M LiPF₆ (1); 1M LiPF₆ (2);
OS3/EC/EMC (2/2/6v) electrolytes with 0.25M LiTFSI+0.75M LiPF₆ (3); 1M LiPF₆ (4);
OS3/EMC (1/1v) electrolytes with 0.25M LiTFSI+0.75M LiPF₆ (5); 1M LiPF₆ (6); OS3/EC (8/2v) electrolytes with 0.25M LiTFSI+0.75M LiPF₆ (7); 1M LiPF₆ (8).

Figure 9A:
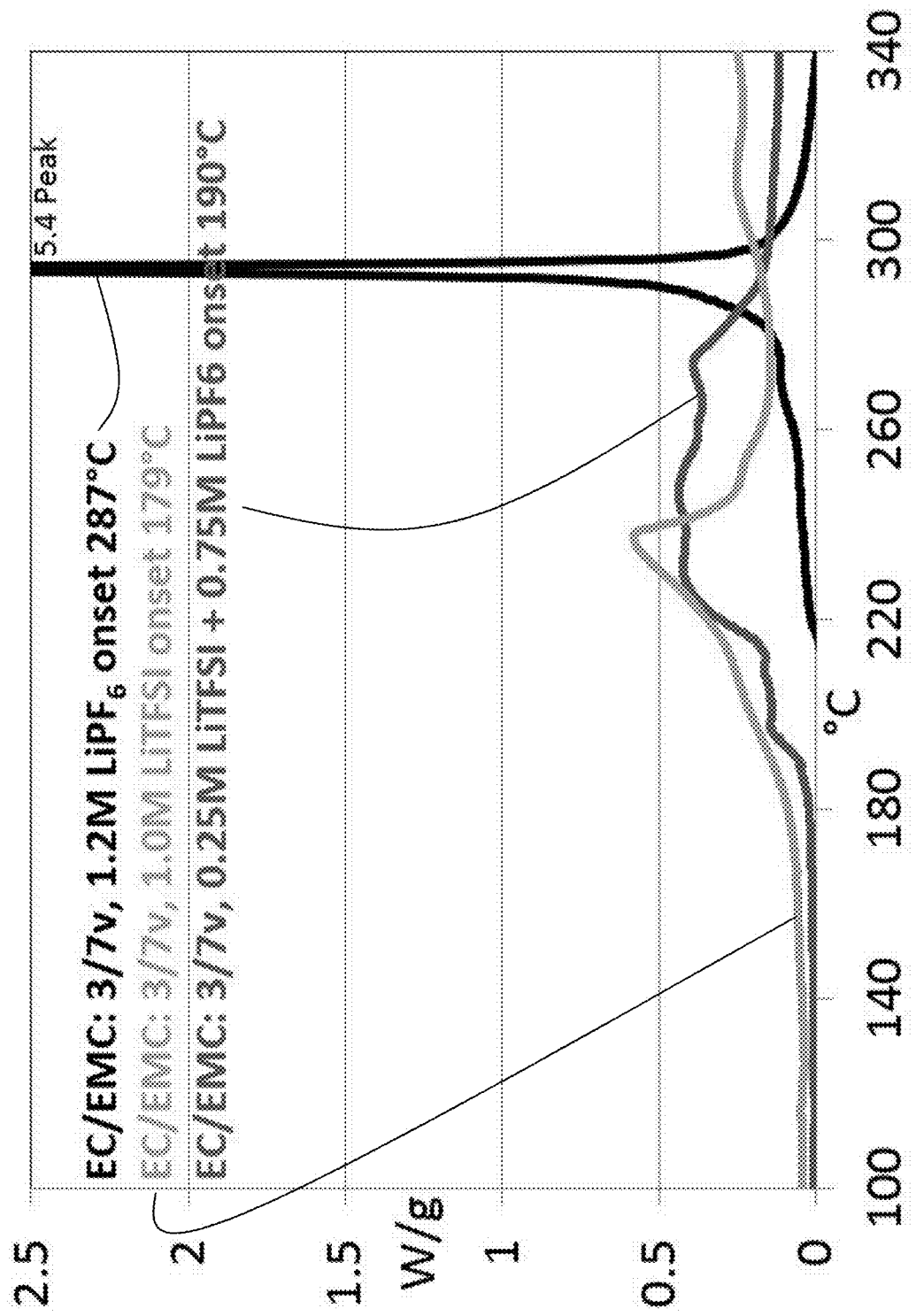
FIGS. 9A and 9B are a series depicting the results of DSC analysis using delithiated commercial Nickel Manganese Cobalt ("NMC") cathode material (specifically NMC "532," that is, $LiNi_{1/2}Mn_{3/10}Co_{1/5}O_2$) in the presence of various electrolytes.
Figure 9B:
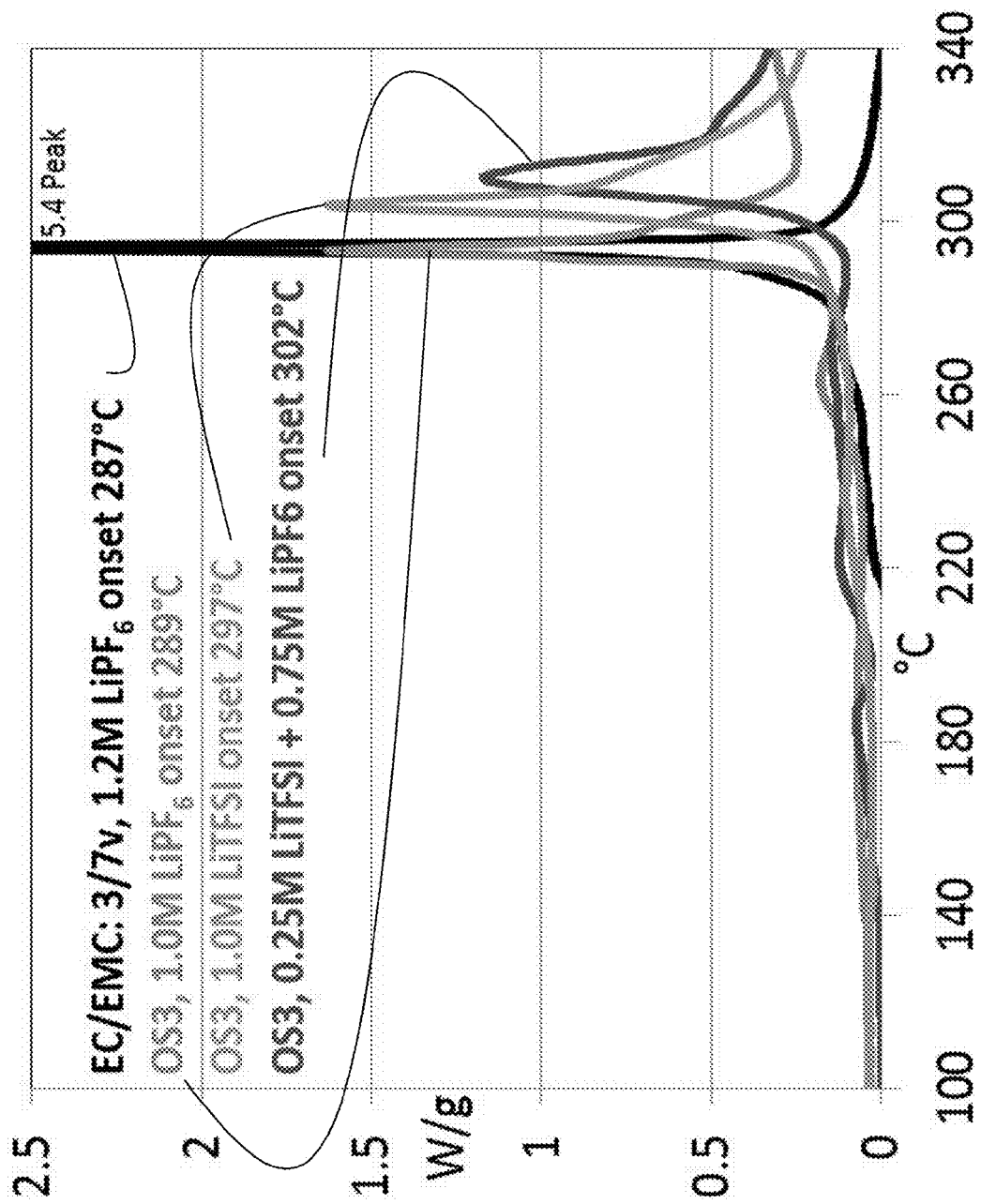

FIGS. 9A and 9B depict DSC thermal safety modeling using delithiated NMC (532) cathode material in presence of various electrolytes. See the figure itself for complete details. The combination of OS3 and LiTFSI show synergistic improvement of thermal stability in DSC testing with NMC with LiTFSI concentration at from about 0.1M to about 1.0M.

Figure 10:
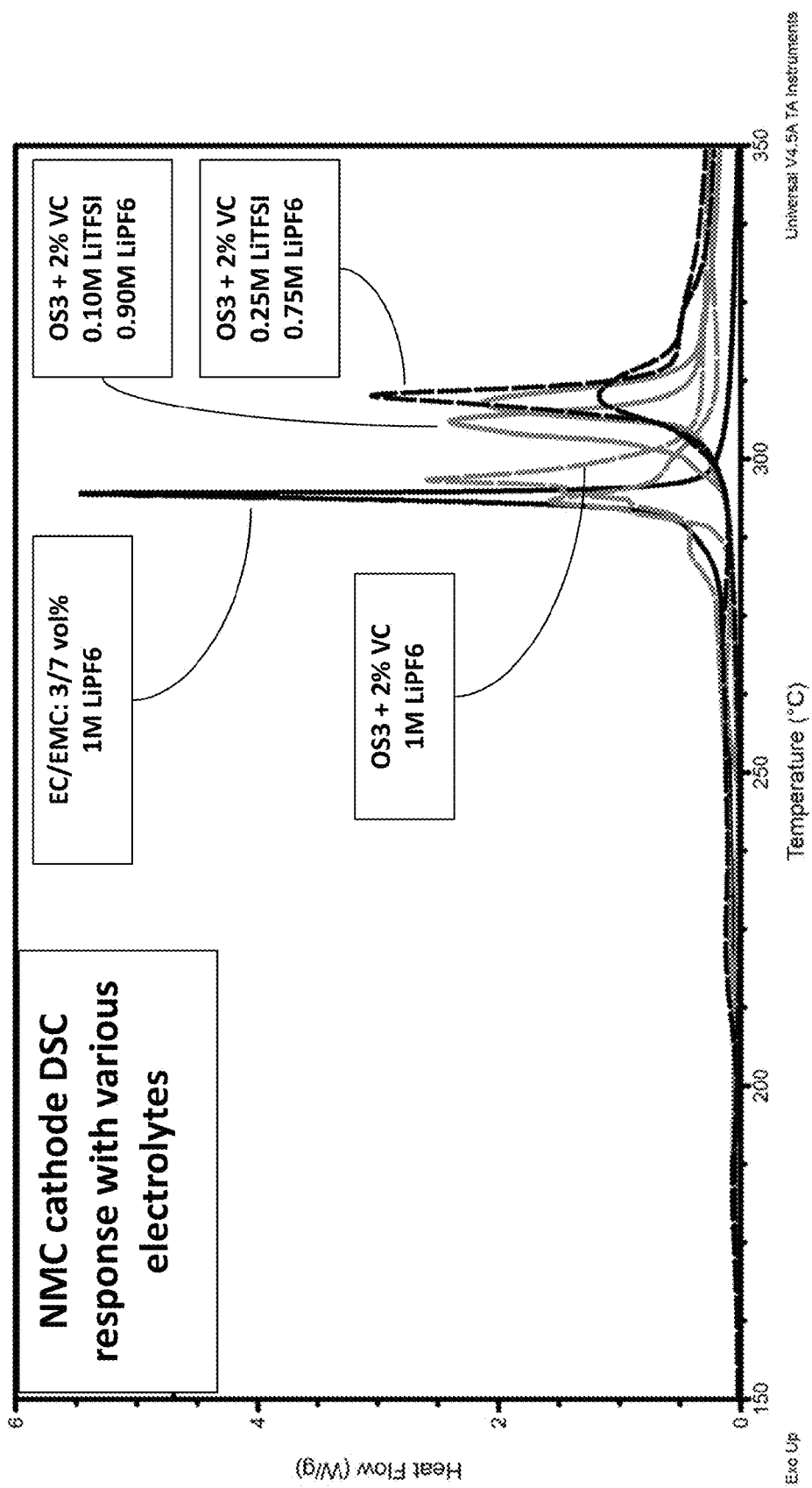
FIG. 10 is another DSC analysis comparing 0.1 M LiTFSI in combination with OS3 electrolytes and an NMC cathode versus other electrolyte compositions. This trace is significant because it indicates that the combination of an OS3 and LiTFSI has a synergistic effect in DSC testing with NMC with LiTFSI concentration at from 0.1M to 1.0M. These compositions remain stable at temperatures well above 250° C.

FIG. 10 is another DSC analysis comparing 0.1 M LiTFSI in combination with OS3 electrolytes and an NMC cathode versus other electrolyte compositions. This trace is significant because it indicates that the combination of an OS3 and LiTFSI has a synergistic effect in DSC testing with NMC with LiTFSI concentration at from 0.1M to 1.0M.

Overall, the DSC experiments with OS electrolytes in combination with imides shows enhanced thermal stability in the presence of energetic charged (de-lithiated) cathodes. Preliminary DSC experiments (data not shown) have been conducted with charged NMC and NCA cathode materials. A significant improvement in the exotherm onset temperature was achieved when OS-based electrolytes with LiTFSI are compared to carbonate baseline with LiPF₆, OS3+LiPF₆ and carbonates+LiTFSI.

Figure 11:
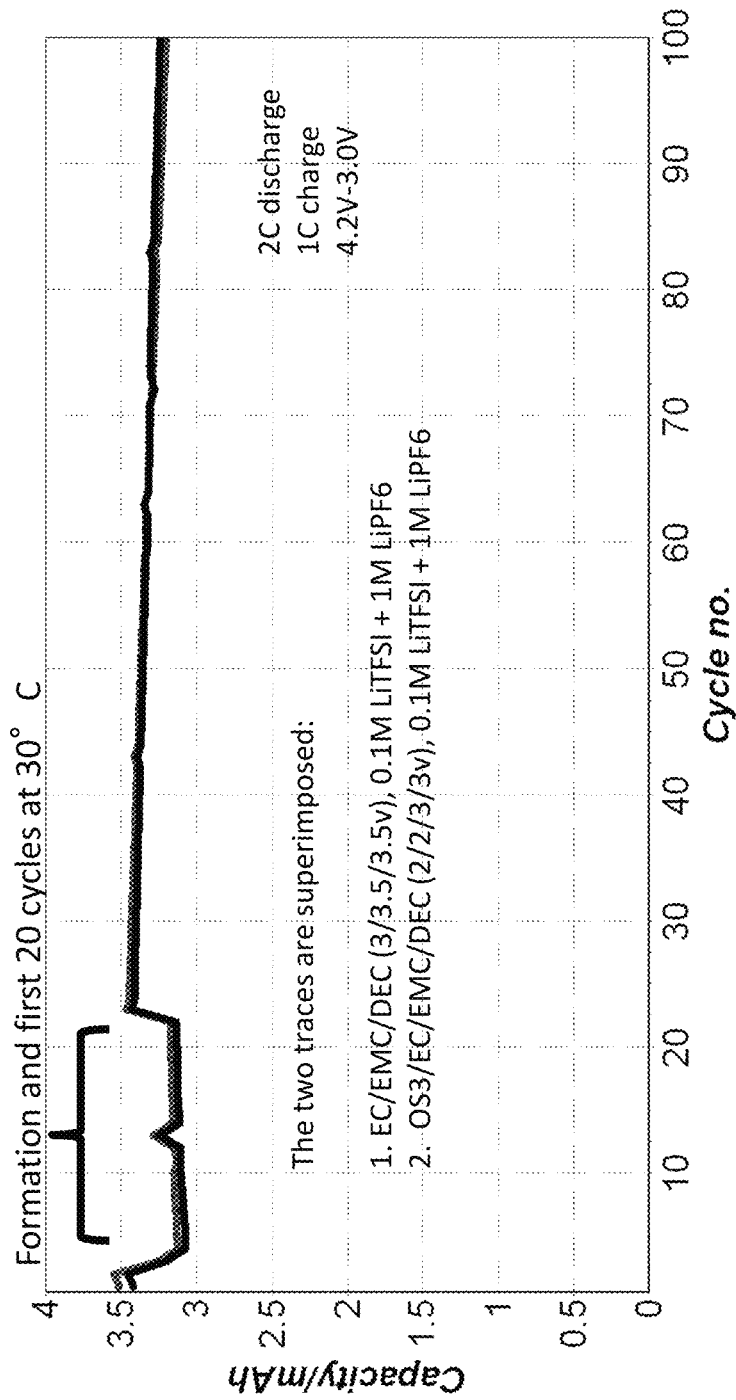
FIG. 11 is a trace depicting cycling stability at 70° C. with imide-containing OS3 electrolytes versus convention carbonate-containing electrolytes as measured in coin cells with NMC/graphite electrodes.

The DSC data clearly show a distinct synergy between OS solvent-based electrolytes and imide salts in general and LiTFSI in particular. Fundamental advantages in DSC testing abuse tolerance can be translated into a full cell design safety and abuse advantage. Both 1M LiTFSI and 0.25M LiTFSI+0.75M LiPF₆ salt formulations with OS and blended OS/carbonate solvents demonstrated higher exotherm onset temperatures than all other variations. For some formulations there was also a lower total heat output Formulating the electrolyte composition with even a limited amount (0.1M) of LiTFSI salt in OS electrolyte has a strong effect on the reactivity of the system, providing a safety advantage over carbonate electrolytes. See especially FIG. 11, which is a trace depicting cycling stability at 70° C. with imide-containing OS3 electrolytes versus convention carbonate-containing electrolytes as measured in coin cells with NMC/graphite electrodes. As shown in FIG. 11, electrolytes containing 0.1M LiTFSI have excellent high-temperature cycling performance.

Figure 12:
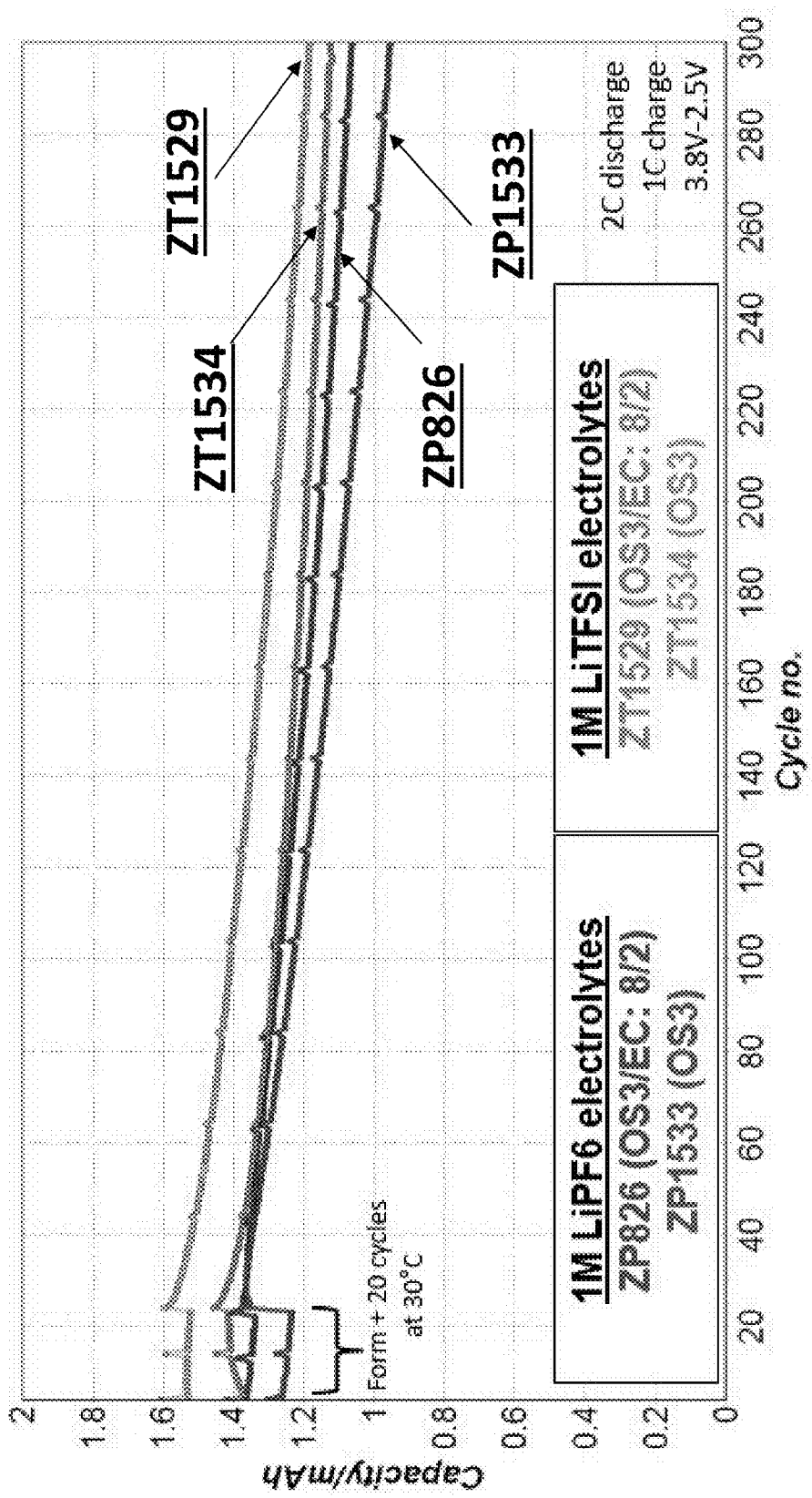

FIGS. 12 and 13 likewise show that electrolyte compositions comprising OS3 compounds in combination with an imide such as LiTFSI or a lithium compound such as LiPF₆ perform admirably over 300 charge/discharge cycles (3.8 V to 2.5 V) at 70° C. This is markedly and unexpectedly better performance at this temperature as compared to conventional electrolyte compositions.

What is claimed is:
1. An electrolyte composition comprising, in combination:
an organosilicon compound and an imide salt and optionally LiPF₆, wherein the organosilicon compound is selected from the group consisting of Formula I or Formula II:

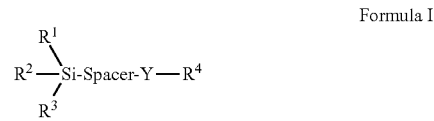

Formula I

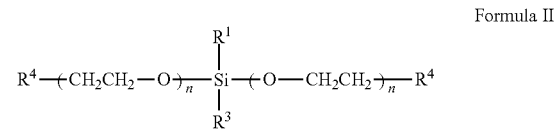

Formula II wherein $R^1$, $R^2$, and $R^3$ are the same or different and are independently selected from the group consisting of $C_1$ to $C_6$ linear or branched alkyl and halogen;

"Spacer" is selected from the group consisting of $C_1$ to $C_6$ linear or branched alkylene, alkenylene, or alkynylene, or "Spacer" is absent, provided that when "Spacer" is absent, Y is present;

Y is absent or is selected from the group consisting of —$(O-CH_2-CH_2)_n$— and

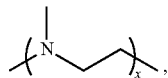

wherein each subscript "n" is the same or different and is an integer from 1 to 15, and subscript "x" is an integer from 1 to 15; and each $R^4$ is the same or different and is selected from the group consisting of cyano (—CN), cyanate (—OCN), isocyanate (—NCO), thiocyanate (—SCN) and isothiocyanate (—NCS);, wherein when subjected to cyclic voltammetry at a plurality of cycles ranging from about 3V to about 5V and using a cathode current collector comprising aluminum versus Li/Li$^+$ electrodes the composition exhibits an oxidative corrosion current of about 0.10 mA/cm$^2$ or less for a second and subsequent cycles; and wherein the composition exhibits a differential scanning calorimetric (DSC) response onset temperature that is at least 5° C. higher than a corresponding DSC response onset temperature of the organosilicon compound absent the imide salt.

2. The electrolyte composition of claim 1, wherein the organosilicon compound has a structure as shown in Formula I.

3. The electrolyte composition of claim 1, wherein the organosilicon compound has a structure as shown in Formula II.

4. The electrolyte composition of claim 1, wherein imide salt comprises a bis(trifluoromethane)sulfonamide (TFSI) anion.

5. The electrolyte composition of claim 4, further comprising lithium bis(oxalato)borate (LiBOB) or LiPF$_6$.

6. The electrolyte composition of claim 5, further comprising a carbonate.

7. The electrolyte composition of claim 6, wherein the carbonate is selected from the group consisting of ethylene carbonate (EC), dimethyl carbonate (DMC), diethyl carbonate (DEC), ethylmethyl carbonate (EMC), propylene carbonate (PC), and fluoroethylene carbonate (FEC).

8. The electrolyte composition of claim 7, comprising LiBOB.

9. An electrochemical device comprising an electrolyte composition as recited in any one of claims 1 to 8.

* * * * *